United States Patent
Crouch et al.

(10) Patent No.: US 12,461,239 B2
(45) Date of Patent: *Nov. 4, 2025

(54) METHOD AND SYSTEM FOR DOPPLER DETECTION AND DOPPLER CORRECTION OF OPTICAL CHIRPED RANGE DETECTION

(71) Applicant: AURORA OPERATIONS, INC., Pittsburgh, PA (US)

(72) Inventors: Stephen C. Crouch, Mountain View, CA (US); Trenton Berg, Mountain View, CA (US); Randy R. Reibel, Mountain View, CA (US); James Curry, Mountain View, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,002

(22) Filed: Sep. 18, 2023

(65) Prior Publication Data
US 2024/0241256 A1 Jul. 18, 2024

Related U.S. Application Data

(63) Continuation of application No. 16/464,657, filed as application No. PCT/US2017/062703 on Nov. 21, 2017, now Pat. No. 11,802,965.
(Continued)

(51) Int. Cl.
*G01S 17/58* (2006.01)
*G01S 7/491* (2020.01)
(Continued)

(52) U.S. Cl.
CPC .............. *G01S 17/58* (2013.01); *G01S 7/491* (2013.01); *G01S 7/4911* (2013.01); *G01S 7/493* (2013.01);
(Continued)

(58) Field of Classification Search
CPC ........ G01S 7/4814; G01S 7/487; G01S 7/491; G01S 7/4911; G01S 7/493; G01S 17/26; G01S 17/34; G01S 17/58; G01S 17/89
See application file for complete search history.

(56) References Cited

U.S. PATENT DOCUMENTS 4,099,249 A 7/1978 Casasent
4,620,192 A 10/1986 Collins
(Continued)

FOREIGN PATENT DOCUMENTS

CA 3222242 A1 6/2024
CN 1576123 A 2/2005
(Continued)

OTHER PUBLICATIONS

Extended European Search Report issued in connection with EP Appl. No. 23189916.2 dated Nov. 9, 2023.
(Continued)

*Primary Examiner* — Luke D Ratcliffe
(74) *Attorney, Agent, or Firm* — Dority & Manning, P.A.

(57) ABSTRACT

Techniques for Doppler correction of chirped optical range detection include obtaining a first set of ranges based on corresponding frequency differences between a return optical signal and a first chirped transmitted optical signal with an up chirp that increases frequency with time. A second set of ranges is obtained based on corresponding frequency differences between a return optical signal and a second chirped transmitted optical signal with a down chirp. A matrix of values for a cost function is determined, one value for each pair of ranges that includes one in the first set and one in the second set. A matched pair of one range in the first set and a corresponding one range in the second set is determined based on the matrix. A Doppler effect on range
(Continued)

is determined based on combining the matched pair of ranges. A device is operated based on the Doppler effect.

18 Claims, 20 Drawing Sheets

Related U.S. Application Data

(60) Provisional application No. 62/428,109, filed on Nov. 30, 2016.

(51) Int. Cl.
- *G01S 7/4911* (2020.01)
- *G01S 7/493* (2006.01)
- *G01S 17/26* (2020.01)
- *G01S 17/34* (2020.01)
- *G01S 17/89* (2020.01)

(52) U.S. Cl.
CPC ............ *G01S 17/26* (2020.01); *G01S 17/34* (2020.01); *G01S 17/89* (2013.01)

(56) References Cited

U.S. PATENT DOCUMENTS

| | | |
|---|---|---|
| 4,648,276 A | 3/1987 | Klepper et al. |
| 4,804,893 A | 2/1989 | Melocik |
| 5,043,553 A | 8/1991 | Corfe et al. |
| 5,075,864 A | 12/1991 | Sakai |
| 5,216,534 A | 6/1993 | Boardman et al. |
| 5,223,986 A | 6/1993 | Mayerjak et al. |
| 5,227,910 A | 7/1993 | Khattak |
| 5,231,401 A | 7/1993 | Kaman et al. |
| 5,461,505 A | 10/1995 | Nishikawa et al. |
| 5,687,017 A | 11/1997 | Katoh et al. |
| 5,781,156 A | 7/1998 | Krasner |
| 5,828,585 A | 10/1998 | Welk et al. |
| 5,947,903 A | 9/1999 | Ohtsuki et al. |
| 5,999,302 A | 12/1999 | Sweeney et al. |
| 6,029,496 A | 2/2000 | Kreft |
| 6,211,888 B1 | 4/2001 | Ohtsuki et al. |
| 6,671,595 B2 | 12/2003 | Lu et al. |
| 6,753,950 B2 | 6/2004 | Morcom |
| 6,871,148 B2 | 3/2005 | Morgen et al. |
| 6,931,055 B1 | 8/2005 | Underbrink et al. |
| 7,122,691 B2 | 10/2006 | Oshima et al. |
| 7,152,490 B1 | 12/2006 | Freund et al. |
| 7,486,802 B2 | 2/2009 | Hougen |
| 7,511,824 B2 | 3/2009 | Sebastian et al. |
| 7,639,347 B2 | 12/2009 | Eaton |
| 7,742,152 B2 | 6/2010 | Hui et al. |
| 7,917,039 B1 | 3/2011 | Delfyett |
| 8,135,513 B2 | 3/2012 | Bauer et al. |
| 8,531,650 B2 | 9/2013 | Feldkhun et al. |
| 8,751,155 B2 | 6/2014 | Lee |
| 8,805,197 B2 | 8/2014 | Delfyett |
| 8,818,609 B1 | 8/2014 | Boyko et al. |
| 8,831,780 B2 | 9/2014 | Zelivinski et al. |
| 8,954,252 B1 | 2/2015 | Urmson et al. |
| 9,041,915 B2 | 5/2015 | Earhart et al. |
| 9,046,909 B2 | 6/2015 | Leibowitz et al. |
| 9,086,273 B1 | 7/2015 | Gruver et al. |
| 9,097,800 B1 | 8/2015 | Zhu |
| 9,257,048 B1 | 2/2016 | Offer et al. |
| 9,348,137 B2 | 5/2016 | Plotkin et al. |
| 9,383,753 B1 | 7/2016 | Templeton et al. |
| 9,607,220 B1 | 3/2017 | Smith et al. |
| 9,618,742 B1 | 4/2017 | Droz et al. |
| 9,753,462 B2 | 9/2017 | Gilliland et al. |
| 10,036,812 B2 | 7/2018 | Crouch et al. |
| 10,231,705 B2 | 3/2019 | Lee |
| 10,345,434 B2 | 7/2019 | Hinderling et al. |
| 10,422,649 B2 | 9/2019 | Engelman et al. |
| 10,485,508 B2 | 11/2019 | Miyaji et al. |
| 10,520,602 B2 | 12/2019 | Villeneuve et al. |
| 10,534,084 B2 | 1/2020 | Crouch et al. |
| 10,568,258 B2 | 2/2020 | Wahlgren |
| 10,571,567 B2 | 2/2020 | Campbell et al. |
| 11,002,856 B2 | 5/2021 | Heidrich et al. |
| 11,041,954 B2 | 6/2021 | Crouch et al. |
| 11,249,192 B2 | 2/2022 | Crouch et al. |
| 11,402,506 B2 | 8/2022 | Ohtomo et al. |
| 11,402,834 B2 | 8/2022 | Yang et al. |
| 11,441,899 B2 | 9/2022 | Pivac et al. |
| 11,822,010 B2 | 11/2023 | Angus et al. |
| 2002/0071109 A1 | 6/2002 | Allen et al. |
| 2002/0140924 A1 | 10/2002 | Wangler et al. |
| 2002/0180868 A1 | 12/2002 | Lippert et al. |
| 2003/0117312 A1* | 6/2003 | Nakanishi ............... G01S 13/42 342/107 |
| 2004/0034304 A1 | 2/2004 | Sumi |
| 2004/0109155 A1 | 6/2004 | Deines |
| 2004/0158155 A1 | 8/2004 | Njemanze |
| 2004/0222366 A1 | 11/2004 | Frick |
| 2005/0149240 A1 | 7/2005 | Tseng et al. |
| 2006/0132752 A1 | 6/2006 | Kane |
| 2006/0239312 A1 | 10/2006 | Kewitsch et al. |
| 2007/0005212 A1 | 1/2007 | Xu et al. |
| 2007/0181810 A1 | 8/2007 | Tan et al. |
| 2008/0018881 A1 | 1/2008 | Hui et al. |
| 2008/0024756 A1 | 1/2008 | Rogers |
| 2008/0040029 A1 | 2/2008 | Breed |
| 2008/0100822 A1 | 5/2008 | Munro |
| 2009/0002679 A1 | 1/2009 | Ruff et al. |
| 2009/0009842 A1 | 1/2009 | Destain et al. |
| 2009/0030605 A1 | 1/2009 | Breed |
| 2009/0059201 A1 | 3/2009 | Willner et al. |
| 2010/0094499 A1 | 4/2010 | Anderson |
| 2010/0183309 A1 | 7/2010 | Etemad et al. |
| 2010/0188504 A1 | 7/2010 | Dimsdale et al. |
| 2010/0312432 A1 | 12/2010 | Hamada et al. |
| 2011/0007299 A1 | 1/2011 | Moench et al. |
| 2011/0013245 A1 | 1/2011 | Tanaka et al. |
| 2011/0015526 A1 | 1/2011 | Tamura |
| 2011/0026007 A1 | 2/2011 | Gammenthaler |
| 2011/0026008 A1 | 2/2011 | Gammenthaler |
| 2011/0205523 A1 | 8/2011 | Rezk et al. |
| 2011/0292371 A1 | 12/2011 | Chang |
| 2012/0038902 A1 | 2/2012 | Dotson |
| 2012/0044556 A1 | 2/2012 | Yamada |
| 2012/0083960 A1 | 4/2012 | Zhu et al. |
| 2012/0127252 A1 | 5/2012 | Lim et al. |
| 2012/0229627 A1 | 9/2012 | Wang |
| 2012/0274922 A1 | 11/2012 | Hodge |
| 2012/0281907 A1 | 11/2012 | Samples et al. |
| 2012/0306383 A1 | 12/2012 | Munro |
| 2013/0104661 A1* | 5/2013 | Klotz .................... G01H 9/00 73/657 |
| 2013/0120989 A1 | 5/2013 | Sun et al. |
| 2013/0268163 A1 | 10/2013 | Comfort et al. |
| 2013/0279392 A1 | 10/2013 | Rubin et al. |
| 2013/0279393 A1 | 10/2013 | Rubin et al. |
| 2013/0279491 A1 | 10/2013 | Rubin et al. |
| 2013/0325244 A1 | 12/2013 | Wang et al. |
| 2014/0036252 A1* | 2/2014 | Amzajerdian ........ G01S 17/875 356/28 |
| 2014/0064607 A1 | 3/2014 | Grossmann et al. |
| 2015/0005993 A1 | 1/2015 | Breuing |
| 2015/0006117 A1 | 1/2015 | Zhang et al. |
| 2015/0046119 A1 | 2/2015 | Sandhawalia et al. |
| 2015/0130607 A1 | 5/2015 | Macarthur |
| 2015/0160332 A1 | 6/2015 | Sebastian et al. |
| 2015/0177379 A1 | 6/2015 | Smith et al. |
| 2015/0185244 A1 | 7/2015 | Inoue et al. |
| 2015/0260836 A1* | 9/2015 | Hayakawa .......... H01Q 13/206 342/368 |
| 2015/0267433 A1 | 9/2015 | Leonessa et al. |
| 2015/0269438 A1 | 9/2015 | Samarasekera et al. |
| 2015/0270838 A1 | 9/2015 | Chan et al. |
| 2015/0282707 A1 | 10/2015 | Tanabe et al. |
| 2015/0323660 A1 | 11/2015 | Hampikian |
| 2015/0331103 A1 | 11/2015 | Jensen |
| 2015/0331111 A1 | 11/2015 | Newman et al. |

(56) References Cited

U.S. PATENT DOCUMENTS

| | | | |
|---|---|---|---|
| 2016/0078303 A1 | 3/2016 | Samarasekera et al. |
| 2016/0084946 A1 | 3/2016 | Turbide |
| 2016/0091599 A1 | 3/2016 | Jenkins |
| 2016/0123720 A1 | 5/2016 | Thorpe et al. |
| 2016/0125739 A1 | 5/2016 | Stewart et al. |
| 2016/0216366 A1 | 7/2016 | Phillips et al. |
| 2016/0245903 A1 | 8/2016 | Kalscheur et al. |
| 2016/0260324 A1 | 9/2016 | Tummala et al. |
| 2016/0266243 A1 | 9/2016 | Marron |
| 2016/0274589 A1 | 9/2016 | Templeton et al. |
| 2016/0299228 A1 | 10/2016 | Maleki et al. |
| 2016/0302010 A1* | 10/2016 | Sebastian ............... G01S 17/58 |
| 2016/0350926 A1 | 12/2016 | Flint et al. |
| 2016/0377721 A1 | 12/2016 | Lardin et al. |
| 2016/0377724 A1 | 12/2016 | Crouch et al. |
| 2017/0160541 A1 | 6/2017 | Carothers et al. |
| 2017/0248691 A1 | 8/2017 | Mcphee et al. |
| 2017/0299697 A1 | 10/2017 | Swanson |
| 2017/0329014 A1 | 11/2017 | Moon et al. |
| 2017/0329332 A1 | 11/2017 | Pilarski et al. |
| 2017/0343652 A1 | 11/2017 | De Mersseman et al. |
| 2017/0350964 A1 | 12/2017 | Kaneda |
| 2017/0350979 A1 | 12/2017 | Uyeno et al. |
| 2017/0356983 A1* | 12/2017 | Jeong ................ G01S 7/4817 |
| 2018/0003805 A1 | 1/2018 | Popovich et al. |
| 2018/0136000 A1 | 5/2018 | Rasmusson et al. |
| 2018/0188355 A1 | 7/2018 | Bao et al. |
| 2018/0224547 A1 | 8/2018 | Crouch et al. |
| 2018/0267556 A1 | 9/2018 | Templeton et al. |
| 2018/0276986 A1 | 9/2018 | Delp |
| 2018/0284286 A1 | 10/2018 | Eichenholz et al. |
| 2018/0299534 A1 | 10/2018 | Lachapelle et al. |
| 2018/0307913 A1 | 10/2018 | Finn et al. |
| 2019/0064831 A1 | 2/2019 | Gali et al. |
| 2019/0086514 A1 | 3/2019 | Dussan et al. |
| 2019/0107606 A1 | 4/2019 | Russell et al. |
| 2019/0154439 A1 | 5/2019 | Binder |
| 2019/0154807 A1 | 5/2019 | Steinkogler et al. |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0258251 A1 | 8/2019 | Ditty et al. |
| 2019/0310351 A1 | 10/2019 | Hughes et al. |
| 2019/0310469 A1 | 10/2019 | Sapir |
| 2019/0317219 A1 | 10/2019 | Smith et al. |
| 2019/0318206 A1 | 10/2019 | Smith et al. |
| 2019/0346856 A1 | 11/2019 | Berkemeier et al. |
| 2019/0361119 A1 | 11/2019 | Kim et al. |
| 2020/0025879 A1 | 1/2020 | Pacala et al. |
| 2020/0049819 A1 | 2/2020 | Cho et al. |
| 2020/0049879 A1 | 2/2020 | Sato |
| 2020/0182978 A1* | 6/2020 | Maleki ................ G01S 17/42 |
| 2020/0192082 A1 | 6/2020 | Zhou et al. |
| 2020/0249349 A1 | 8/2020 | Steinberg |
| 2021/0089047 A1 | 3/2021 | Smith et al. |
| 2021/0165102 A1 | 6/2021 | Crouch et al. |
| 2021/0302579 A1 | 9/2021 | Jin |
| 2021/0325664 A1 | 10/2021 | Adams et al. |
| 2021/0349196 A1 | 11/2021 | Wang et al. |
| 2022/0057626 A1 | 2/2022 | Wang et al. |
| 2022/0057627 A1 | 2/2022 | Lee et al. |
| 2022/0260686 A1 | 8/2022 | Wang et al. |
| 2022/0413260 A1 | 12/2022 | Gassend et al. |
| 2023/0025474 A1 | 1/2023 | Baker et al. |
| 2024/0045426 A1 | 2/2024 | Ditty et al. |
| 2024/0280703 A1 | 8/2024 | Petilli et al. |

FOREIGN PATENT DOCUMENTS

| | | |
|---|---|---|
| CN | 1668939 A | 9/2005 |
| CN | 101346773 A | 1/2009 |
| CN | 102150007 A | 8/2011 |
| CN | 103227559 A | 7/2013 |
| CN | 103608696 A | 2/2014 |
| CN | 104040369 A | 9/2014 |
| CN | 104793619 A | 7/2015 |
| CN | 104914445 A | 9/2015 |
| CN | 104956400 A | 9/2015 |
| CN | 105116922 A | 12/2015 |
| CN | 105425245 A | 3/2016 |
| CN | 105629258 A | 6/2016 |
| CN | 105652282 A | 6/2016 |
| CN | 105713730 | 6/2016 |
| CN | 107015238 A | 8/2017 |
| CN | 107024686 A | 8/2017 |
| CN | 107193011 A | 9/2017 |
| CN | 207318710 U | 5/2018 |
| DE | 10 2004 050 682 A1 | 6/2005 |
| DE | 10 2007 001 103 A1 | 7/2008 |
| DE | 10 2016 001 772 A1 | 8/2016 |
| DE | 10 2017 200 692 A1 | 8/2018 |
| EP | 1 298 453 A2 | 4/2003 |
| EP | 1 298 453 B1 | 4/2003 |
| EP | 2 243 042 B1 | 10/2010 |
| EP | 3 330 766 A1 | 6/2018 |
| FR | 2568688 A1 | 2/1986 |
| GB | 2 349 231 A | 10/2000 |
| JP | S63-071674 A | 4/1988 |
| JP | H06-148556 A | 5/1994 |
| JP | H09-081659 A | 3/1997 |
| JP | H09-257415 A | 10/1997 |
| JP | H09-325290 A | 12/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 3422720 B2 | 6/2003 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-288255 A | 12/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2015-535925 A | 12/2015 |
| JP | 2016-099584 A | 5/2016 |
| JP | 2017-138219 A | 8/2017 |
| JP | 2017-524918 A | 8/2017 |
| JP | 2018-173346 A | 11/2018 |
| JP | 2018-204970 A | 12/2018 |
| JP | 2021-026048 A | 2/2021 |
| JP | 2023-510970 A | 3/2023 |
| JP | 2023-534594 A | 8/2023 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/011241 A2 | 1/2014 |
| WO | WO-2014/132020 A1 | 9/2014 |
| WO | WO-2015/037173 A1 | 3/2015 |
| WO | WO-2015/122095 A1 | 8/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |

(56) References Cited

FOREIGN PATENT DOCUMENTS

| WO | WO-2018/102190 A1 | 6/2018 |
|---|---|---|
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

First Office Opinion Notice re: CN Application No. 202111404151 dated May 12, 2024.
International Search Report and Written Opinion issued in connection with PCT/US2023/011341 dated Feb. 16, 2024.
Office Action issued in connection with Japanese Appl. No. 2023-095571 dated Feb. 20, 2024.
Office Action issued in connection with Chinese Appl. No. 202310820368.1 dated Feb. 28, 2024.
Office Action issued in connection with Chinese Appl. No. 202180034633.2 dated Mar. 9, 2024.
Adany, P. et al., "Chirped Lidar Using Simplified Homodyne Detection," Journal of Lightwave Technology, vol. 27, No. 16, Aug. 15, 2009, pp. 3351-3357.
Anonymous, "Fundamentals of Direct Digital Synthesis," Analog Devices, MT-085 Tutorial Rev. D, copyright 2009, pp. 1-9.
Anonymous, "Occlusion—Shadows and Occlusion—Peachpit", Jul. 3, 2006 (Jul. 3, 2006), P055697780, Retrieved from the Internet: URL:https://www.peachpit.com/articles/article.aspx?p=486505 &seqNum=7[retrieved on May 25, 2020] 2 pages.
Aull, B. et al., "Geiger-Mode Avalanche Photodiodes for Three-Dimensional Imaging," Lincoln Laboratory Journal, vol. 13, No. 2, 2002, pp. 335-350.
Australian Examination Report issued in connection with AU Appl. Ser. No. 2021271815 dated Jun. 27, 2023.
Bashkansky, M. et al., "RF phase-coded random-modulation LIDAR," Optics Communications, vol. 231, 2004, pp. 93-98.
Beck, S. et al., "Synthetic-aperture imaging laser radar: laboratory demonstration and signal processing," Applied Optics, vol. 44, No. 35, Dec. 10, 2005, pp. 7621-7629.
Berkovic, G. and Shafir, E., "Optical methods for distance and displacement measurements", Advances in Optics and Photonics, vol. 4, Issue 4, Dec. 2012, pp. 441-471.
Besl, P. and Mckay, N., "A Method for Registration of 3-D shapes", IEEE Transactions on Pattern Analysis and Machine Intelligence, vol. 14, No. 2, Feb. 1992, pp. 239-256.
Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.
Canadian Office Action issued in connection with CA Appl. Ser. No. 3125553 dated Sep. 28, 2022.
Cao, X et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.
Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.
Chester, David B. "A Parameterized Simulation of Doppler Lidar", All Graduate Thesis and Dissertions, Dec. 2017, Issue 6794, <URL: https://digitalcommons.usu.edu/etd/6794 > * pp. 13-14, 27-28, 45*.
Chinese Office Action issued in related CN Appl. Ser. No. 201780081804.0 dated Dec. 1, 2022 (20 pages).
Chinese Office Action on CN Appl. Ser. No. 201880009947.5 dated Oct. 11, 2021 (5 pages).
Contu, F., "The Do's and Don'ts of High Speed Serial Design in FPGA's". Xilinix All Programmable, Copyright 2013, High Speed Digital Design & Validation Seminars 2013, pp. 1-61.
Corrected Notice of Allowance on U.S. Appl. No. 16/725,419 dated May 28, 2020 (2 pages).
Crouch, S. and Barber, Z., "Laboratory demonstrations of interferometric and spotlight synthetic aperture ladar techniques," Optics Express, vol. 20, No. 22, Oct. 22, 2012, pp. 24237-24246.
Crouch, S. et al., "Three dimensional digital holographic aperture synthesis", Optics Express, vol. 23, No. 18, Sep. 7, 2015, pp. 23811-23816.
Dapore, B. et al., "Phase noise analysis of two wavelength coherent imaging system", Optics Express, vol. 21, No. 25, Dec. 16, 2013, pp. 30642-30652.
Decision of Rejection on JP Appl. Ser. No. 2019-527155 dated Jun. 8, 2021 (8 pages).
Decision of Rejection on JP Appl. Ser. No. 2020-559530 dated Aug. 31, 2021 (13 pages).
Duncan, B. and Dierking, M., "Holographic aperture ladar: erratum", Applied Optics, vol. 52, No. 4, Feb. 1, 2013, pp. 706-708.
Duncan, B. et al., "Holographic aperture ladar", Applied Optics, vol. 48, Issue 6, Feb. 20, 2009, pp. 1168-1177.
El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
European Office Action on EP 17876731.5 dated Feb. 21, 2022 (5 pages).
Examination Report No. 1 issued in connection with AU Appl. Ser. No. 2021229207 dated Oct. 10, 2022.
Examination Report on EP Appl. Ser. No. 17898933.1 dated May 25, 2022 (5 pages).
Examination Report on EP Appl. Ser. No. 19791789.1 dated Dec. 21, 2021 (12 pages).
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Fehr, D. et al., "Compact Covariance descriptors in 3D point clouds for object recognition," presented at the Robotics and Automation (ICRA), May 14, 2012, IEEE International Conference, pp. 1793-1798.
Final Office Action on U.S. Appl. No. 16/464,657 DTD Mar. 30, 2023.
Final Office Action on U.S. Appl. No. 16/464,657 DTD Jun. 30, 2022.
Final Office Action on U.S. Appl. No. 16/875,114 DTD Dec. 22, 2022.
Final Office Action on U.S. Appl. No. 17/592,286 DTD May 30, 2023.
Final Office Action on U.S. Appl. No. 17/592,286 DTD Aug. 18, 2022.
Final Office Action on U.S. Appl. No. 16/725,399 dated Aug. 26, 2020 (57 pages).
Final Rejection on U.S. Appl. No. 17/167,857 dated Oct. 25, 2021 (46 pages).
Final US Office Action on U.S. Appl. No. 17/331,362 dated Nov. 29, 2021 (17 pages).
First Chinese Office Action on CN Appl. Ser. No. 201980087957.5 dated Mar. 7, 2022 (8 pages).
First Office Action on CN Appl. Ser. No. 201780081215.2 dated Mar. 3, 2021 (14 pages).
First Office Action on CN Appl. Ser. No. 201780081968.3 dated Dec. 3, 2020 (6 pages).

(56) References Cited

OTHER PUBLICATIONS

First Office Action on CN Appl. Ser. No. 201980033898.3 dated Apr. 20, 2021 (14 pages).
Foreign Action other than Search Report on CN DTD Dec. 1, 2022.
Foreign Action other than Search Report on CN DTD May 11, 2023.
Foreign Action other than Search Report on CN DTD May 22, 2023.
Foreign Action other than Search Report on CN DTD Jul. 18, 2023.
Foreign Action other than Search Report on EP DTD Mar. 1, 2023.
Foreign Action other than Search Report on EP 17876081.5 DTD Jun. 1, 2022.
Foreign Action other than Search Report on EP 17888807.9 DTD Jun. 1, 2022.
Foreign Action other than Search Report on IL DTD Jul. 2, 2023.
Foreign Action other than Search Report on JP DTD Nov. 8, 2022.
Foreign Action other than Search Report on PCT DTD Nov. 24, 2022.
Foucras, M. et al., "Detailed Analysis of the Impact of the Code Doppler on the Acquisition Performance of New GNSS Signals," ION ITM, International Technical Meeting of The Institute of Navigation, San Diego, California, Jan. 27, 2014, pp. 1-13.
Garcia Monreal, J. et al., "Detection of Three Dimensional Objects Based on Phase Encoded Range Images", Sixth International Conference on Correlation Optics, vol. 5477, Jun. 4, 2004, pp. 269-280.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions In Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Preliminary Report on Patentability and Written Opinion issued in connection with PCT Appl. Ser. No. PCT/US2021/032515 dated Nov. 15, 2022.
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).
International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Korean Office Action issued in connection with KR Appl. Ser. No. 10-2021-7023519 dated Feb. 13, 2023.
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3x3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).
Lu et al., "Recognizing objects in 3D point clouds with multi-scale features", Sensors 2014, 14, 24156-24173; doi: 10.3390/s141224156 (Year: 2014).
Lu, M. et al., "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.
MacKinnon, D. et al., "Adaptive laser range scanning", American Control Conference, Piscataway, NJ, 2008, pp. 3857-3862.
Marron, J. et al., "Three-dimensional Lensless Imaging Using Laser Frequency Diversity", Applied Optics, vol. 31, No. 2, Jan. 10, 1992, pp. 255-262.
Miyasaka, T. et al., "Moving Object Tracking and Identification in Traveling Environment Using High Resolution Laser Radar", Graphic Information Industrial, vol. 43, No. 2, pp. 61-69, Feb. 1, 2011.
Munkres, J., "Algorithms for the Assignment and Transportation Problems", Journal of the Society for Industrial and Applied Mathematics, vol. 5, No. 1, Mar. 1957, pp. 32-38.
Non-Final Office Action on U.S. Appl. No. 16/464,108 DTD Jul. 25, 2022.
Non-Final Office Action on U.S. Appl. No. 16/464,657 DTD Nov. 9, 2022.
Non-Final Office Action on U.S. Appl. No. 16/875,114 DTD Apr. 12, 2023.
Non-Final Office Action on U.S. Appl. No. 16/875,114 DTD Aug. 18, 2022.
Non-Final Office Action on U.S. Appl. No. 17/586,523 DTD May 18, 2023.
Non-Final Office Action on U.S. Appl. No. 17/592,286 DTD Dec. 30, 2022.
Non-Final Office Action on U.S. Appl. No. 17/956,389 DTD May 11, 2023.
Non-Final Office Action on U.S. Appl. No. 16/464,063 dated Apr. 22, 2022 (23 pages).
Non-Final Office Action on U.S. Appl. No. 16/464,648 dated Jun. 1, 2021 (6 pages).
Non-Final Office Action on U.S. Appl. No. 16/464,657 dated Dec. 22, 2021 (17 pages).
Non-Final Office Action on U.S. Appl. No. 16/535,127 dated Jun. 3, 2022 (6 pages).
Non-Final Office Action on U.S. Appl. No. 16/725,399 dated Mar. 5, 2020 (53 pages).
Non-Final Office Action on U.S. Appl. No. 16/725,419 dated Feb. 24, 2020 (4 pages).
Non-Final Office Action on U.S. Appl. No. 17/167,857 dated Apr. 6, 2022 (50 pages).
Non-Final Office Action on U.S. Appl. No. 17/592,286 dated Apr. 20, 2022 (16 pages).
Notice of Allowance for U.S. Appl. No. 16/725,399 dated Dec. 3, 2020 (11 pages).
Notice of Allowance on KR Appl. Ser. No. 10-2019-7019062 dated Feb. 10, 2021 (4 Pages).

(56) References Cited

OTHER PUBLICATIONS

Notice of Allowance on KR Appl. Ser. No. 10-2019-7019076 dated Feb. 15, 2021 (4 pages).
Notice of Allowance on KR Appl. Ser. No. 10-2019-7019078 dated Feb. 15, 2021 (4 pages).
Notice of Allowance on U.S. Appl. No. 16/464,063 DTD Aug. 9, 2022.
Notice of Allowance on U.S. Appl. No. 16/464,108 DTD Nov. 16, 2022.
Notice of Allowance on U.S. Appl. No. 16/464,657 DTD Jun. 23, 2023.
Notice of Allowance on U.S. Appl. No. 16/535,127 DTD Oct. 4, 2022.
Notice of Allowance on U.S. Appl. No. 16/875,114 DTD Jul. 26, 2023.
Notice of Allowance on U.S. Appl. No. 17/167,857 DTD Aug. 8, 2022.
Notice of Allowance on U.S. Appl. No. 17/167,857 DTD Aug. 24, 2022.
Notice of Allowance on U.S. Appl. No. 17/586,523 DTD Aug. 30, 2023.
Notice of Allowance on U.S. Appl. No. 16/464,648 dated Oct. 13, 2021 (7 pages).
Notice of Allowance on U.S. Appl. No. 15/423,978 dated Jul. 15, 2019 (8 pages).
Notice of Allowance on U.S. Appl. No. 15/645,311 dated Apr. 18, 2019 (13 pages).
Notice of Allowance on U.S. Appl. No. 16/515,538 dated Feb. 23, 2021 (16 pages).
Notice of Allowance on U.S. Appl. No. 16/725,419 dated Apr. 15, 2020 (9 pages).
Notice of Final Rejection for KR Appl. Ser. No. 10-2021-7019744 dated Jan. 25, 2022 (3 pages).
Notice of Preliminary Rejection on KR Appl. Ser. No. 10-2021-7014545 dated Aug. 19, 2021 (17 pages).
Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).
Notice of Reasons for Refusal on JP Appl. Ser. No. 2020-559530 dated Apr. 20, 2021 (11 pages).
Notice of Reasons for Refusal on JP Appl. Ser. No. 2021-118743 dated Jun. 7, 2022 (9 pages).
Notice of Reasons for Refusal on JP Appl. Ser. No. 2021-165072 dated Apr. 19, 2022 (10 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Apr. 26, 2022 (11 pages).
Notice of Reasons for Refusal on JP Appl. Ser. No. 2021-538998 dated Nov. 30, 2021 (20 pages).
Notice of Reasons for Rejection issued in connection with JP Appl. Ser. No. JP 120261-126516 dated Dec. 13, 2022 (with English translation, 14 pages).
Notice of Reasons for Rejection issued in connection with JP Appl. Ser. No. JP 2021-126516 dated Jun. 21, 2022 (16 pages).
Notice of Reasons of Rejection issued in connection with JP Appl. Ser. No. 2022-000212 dated Feb. 7, 2023.
O'Donnell, R., "Radar Systems Engineering Lecture 11 Waveforms and Pulse Compression," IEEE New Hampshire Section, Jan. 1, 2010, pp. 1-58.
Office Action for U.S. Appl. No. 17/167,857 dated Jun. 28, 2021 (37 pages).
Office Action issued in connection with Japanese Appl. No. 2022-569030 dated Aug. 22, 2023.
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).
Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.
Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Chinese Office Action issued in connection with CN Appl. Ser. No. 201980087957.5 dated Sep. 20, 2022.
Second Chinese Office Action on CN Appl. Ser. No. 201880009947.5 dated Apr. 4, 2022 (3 pages).
Second Chinese Office Action on CN Appl. Ser. No. 201980033898.3 dated Oct. 27, 2021 (6 pages).
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Chinese Office Action issued in connection with CN Appl. Ser. No. 201980087957.5 dated Jan. 20, 2023.
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
US Notice of Allowance on US DTD Sep. 14, 2022.
US Notice of Allowance on U.S. Appl. No. 17/331,362 dated Feb. 17, 2022 (14 pages).
US Office Action on US DTD Dec. 1, 2022.
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.

(56) References Cited

OTHER PUBLICATIONS

Wikipedia, "Digital-to-analog converter", retrieved from https://en.wikipedia.org/wiki/Digital-to-analog_converter, on Apr. 15, 2017, 7 pages.

Wikipedia, "Field-programmable gate array", retrieved from https://en.wikipedia.org/wiki/Field-programmable_gate_array, on Apr. 15, 2017, 13 pages.

Wikipedia, "In-phase and quadrature components", retrieved from https://en.wikipedia.org/wiki/In-phase_and_quadrature_components, on Jan. 26, 2018, 3 pages.

Wikipedia, "Phase-shift keying", retrieved from https://en.wikipedia.org/wiki/Phase-shift_keying#Binary_phase-shift_keying.28BPSK.29, on Oct. 23, 2016, 9 pages.

Ye, J., "Least Squares Linear Discriminant Analysis", 24th International Conference on Machine Learning, pp. 1087-1093 (as of Nov. 27, 2016).

Office Action issued in connection with Japanese Appl. No. 2024-546109 dated Dec. 17, 2024.

Office Action issued in connection with Chinese Appl. No. 202111234165.1 dated Oct. 15, 2024.

Manninen, A J., O'Connor, E. J., Vakkari, V., and Petaja, T.: A generalised background correction algorithm for a Halo Doppler lidar and its application to data from Finland, Atmos. Meas. Tech., 9, 817—827, https://doi.org/10.5194/amt-9-817-2016, 2016.

Office Action issued in connection with Chinese Appl. No. 202210388750.5 dated Dec. 30, 2024.

\* cited by examiner

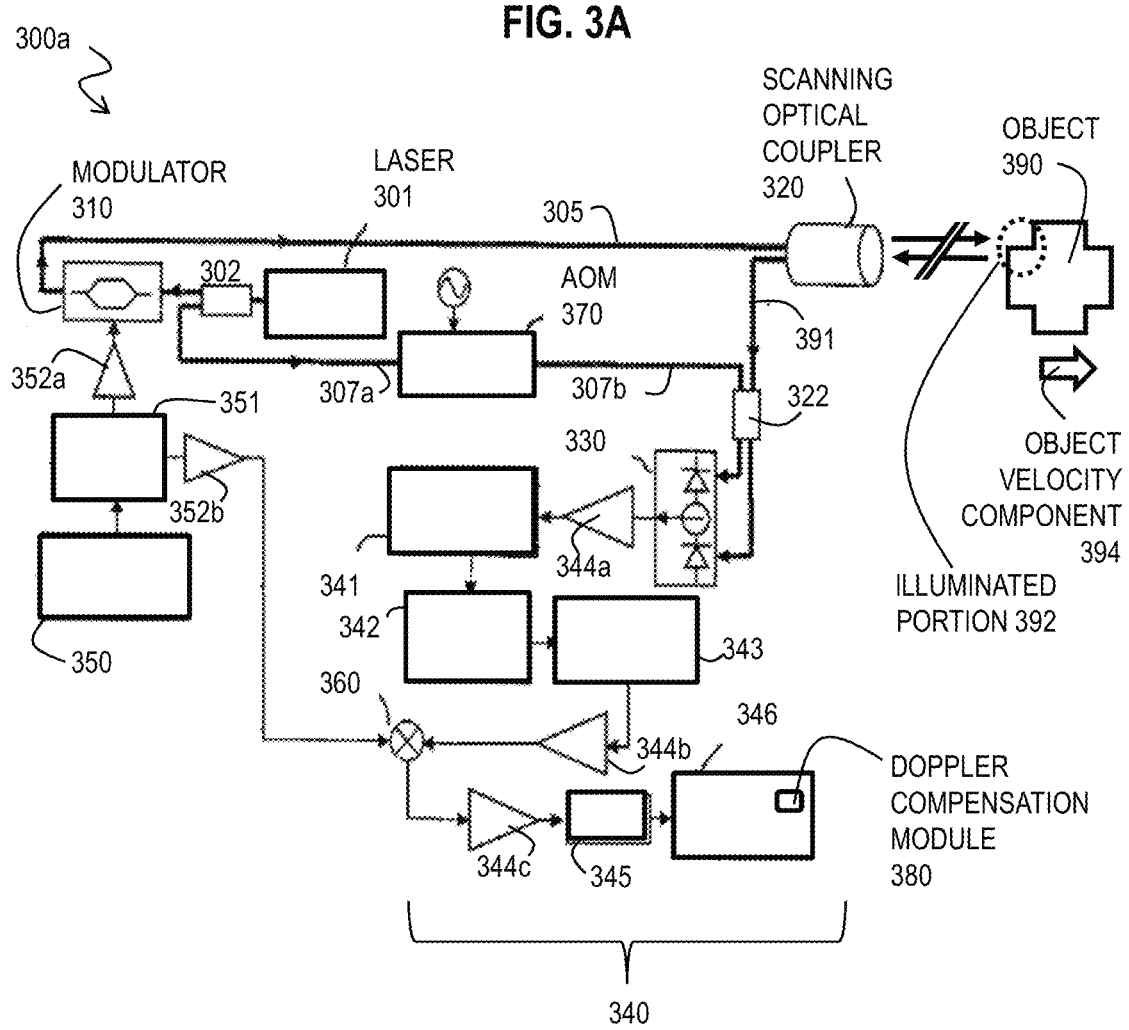

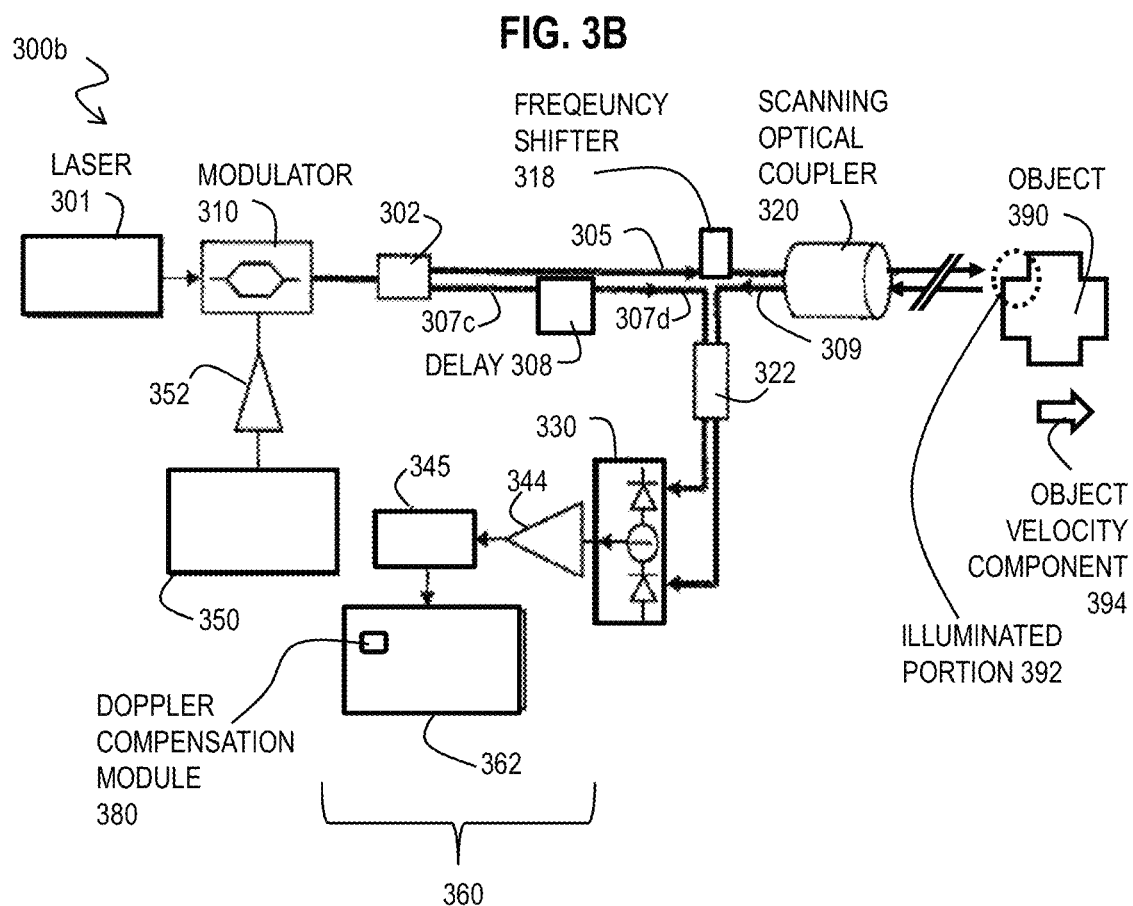

$$Cost\ Matrix = \begin{matrix} C_{11} & C_{12} & C_{13} \\ C_{21} & C_{22} & C_{23} \end{matrix}$$

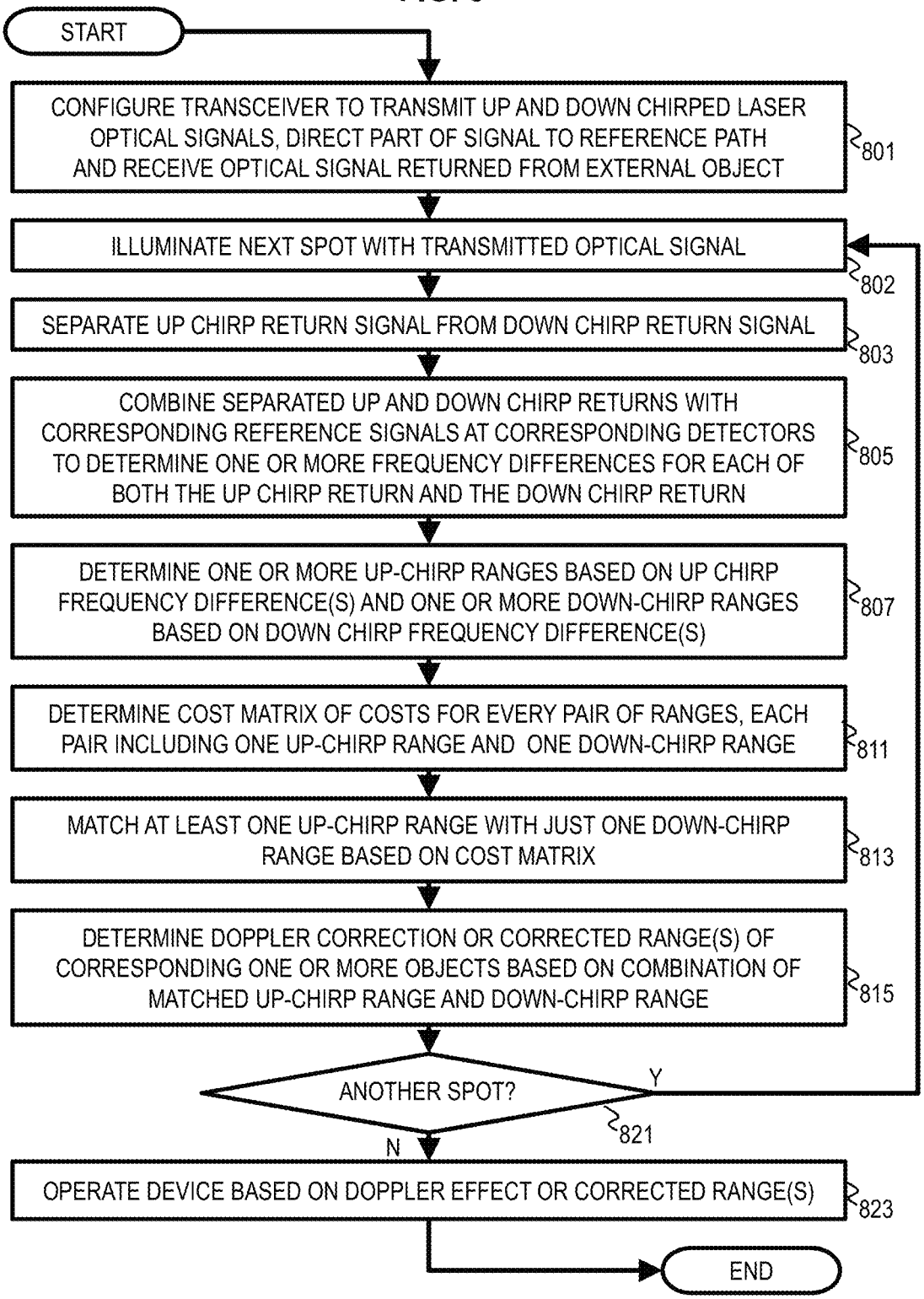

METHOD AND SYSTEM FOR DOPPLER DETECTION AND DOPPLER CORRECTION OF OPTICAL CHIRPED RANGE DETECTION

CROSS-REFERENCE TO RELATED APPLICATIONS

This application is a continuation of U.S. patent application Ser. No. 16/464,657, filed May 28, 2019, which is a national stage application of International Application No. PCT/US2017/062703, filed Nov. 21, 2017, which claims the benefit of and priority to U.S. Provisional Application No. 62/428,109, filed Nov. 30, 2016. The disclosures of U.S. patent application Ser. No. 16/464,657, International Application No. PCT/US2017/062703, and U.S. Provisional Application No. 62/428,109 are incorporated herein by reference in their entireties.

STATEMENT OF GOVERNMENTAL INTEREST

This invention was made with government support under contract W9132V-14-C-0002 awarded by the Department of the Army. The government has certain rights in the invention.

BACKGROUND

Optical detection of range, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to a target, and chirped detection based on a frequency difference between a transmitted chirped optical signal and a returned signal scattered from a target.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped LIDAR systems use long optical pulses with relatively low peak optical power. In this configuration, the range accuracy depends on the chirp bandwidth rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency that is proportional to the difference in frequencies between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152 shows a novel simpler arrangement of optical components that uses, as the reference optical signal, an optical signal split from the transmitted optical signal. This arrangement is called homodyne detection in that patent.

SUMMARY

The current inventors have recognized circumstances and applications in which motion of an object, to which range is being detected using an optical chirp, noticeably affects such applications due to Doppler frequency shifts. Techniques are provided for detecting the Doppler effect and compensating for the Doppler effect in such optical chirp range measurements.

In a first set of embodiments, a method implemented on a processor includes obtaining a first set of one or more ranges based on corresponding frequency differences in a return optical signal compared to a first chirped transmitted optical signal. The first chirped transmitted optical signal includes an up chirp that increases its frequency with time. The method further includes obtaining a second set of one or more ranges based on corresponding frequency differences in a return optical signal compared to a second chirped transmitted optical signal. The second chirped transmitted optical signal includes a down chirp that decreases its frequency with time. The method still further includes determining a matrix of values for a cost function, one value for the cost function for each pair of ranges, in which each pair of ranges includes one range in the first set and one range in the second set. Even further, the method includes determining a matched pair of ranges which includes one range in the first set and a corresponding one range in the second set, where the correspondence is based on the matrix of values. Still further, the method includes determining a Doppler effect on range based on combining the matched pair of ranges. Still further, the method includes operating a device based on the Doppler effect.

In a second set of embodiments, an apparatus includes a laser source configured to provide a first optical signal consisting of an up chirp in a first optical frequency band and a simultaneous down chirp in a second optical frequency band that does not overlap the first optical frequency band. The apparatus includes a first splitter configured to receive the first signal and produce a transmitted signal and a reference signal. The apparatus also includes an optical coupler configured to direct the transmitted signal outside the apparatus and to receive any return signal backscattered from any object illuminated by the transmitted signal. The apparatus also incudes a frequency shifter configured to shift the transmitted signal or the return signal a known frequency shift relative to the reference signal. Still further, the apparatus includes an optical detector disposed to receive the reference signal and the return signal after the known frequency shift is applied. In addition, the apparatus still further includes a processor configured to perform the steps of receiving an electrical signal from the optical detector. The processor is further configured to support determination of a Doppler effect due to motion of any object illuminated by the transmitted signal by determining a first set of zero or more beat frequencies in a first frequency band and a second set of zero or more beat frequencies in a second non-overlapping frequency band of the electrical signal. The first frequency band and the second non-overlapping frequency band are determined based on the known frequency shift.

In some embodiments of the second set, the laser source is made up of a laser, a radio frequency waveform generator, and a modulator. The laser is configured to provide a light beam with carrier frequency f0. The radio frequency waveform generator is configured to generate a first chirp in a radio frequency band extending between fa and fb, wherein fb>fa>0. The modulator is configured to produce, based on the first chirp, the first optical signal in which the first optical frequency band is in a first sideband of the carrier frequency and the second optical frequency band is in a second sideband that does not overlap the first sideband.

In a third set of embodiments, an apparatus includes a laser source configured to provide a first optical signal consisting of an up chirp in a first optical frequency band and a simultaneous down chirp in a second optical frequency band that does not overlap the first optical frequency band. The apparatus includes a first splitter configured to receive the first signal and produce a transmitted signal and a reference signal. The apparatus also includes an optical coupler configured to direct the transmitted signal outside the apparatus and to receive any return signal backscattered from any object illuminated by the transmitted signal. Still further, the apparatus includes a second splitter configured to produce two copies of the reference signal and two copies of the return signal. Even further, the apparatus includes two optical filters. A first optical filter is configured to pass the first optical frequency band and block the second optical frequency band. A second optical filter is configured to pass the second optical frequency band and block the first optical sideband. The apparatus yet further includes two optical detectors. A first optical detector is disposed to receive one copy of the reference signal and one copy of the return signal after passing through the first optical filter. A second optical detector is disposed to receive a different copy of the reference signal and a different copy of the return signal after passing through the second optical filter. In addition, the apparatus still further includes a processor configured to perform the steps of receiving a first electrical signal from the first optical detector and a second electrical signal from the second optical detector. The processor is further configured to support determination of a Doppler effect due to motion of any object illuminated by the transmitted signal by determining a first set of zero or more beat frequencies in the first electrical signal, and determining a second set of zero or more beat frequencies in the second electrical signal.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3A is a block diagram that illustrates example components of a heterodyne chirped LIDAR system, according to an embodiment;

FIG. 3B is a block diagram that illustrates example components of a homodyne chirped LIDAR system, according to an embodiment;

FIG. 8 is a flow chart that illustrates an example method for using an up and down chirp LIDAR system to compensate for Doppler effects on ranges, according to an embodiment;

DETAILED DESCRIPTION

A method and apparatus and system and computer-readable medium are described for Doppler correction of optical chirped range detection. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a linear frequency modulated optical signal but chirps need not be linear and can vary frequency according to any time varying rate of change. Embodiments are described in the context of a single optical beam and its return on a single detector or pair of detectors, which can then be scanned using any known scanning means, such as linear stepping or rotating optical components or with arrays of transmitters and detectors or pairs of detectors.

1. CHIRPED DETECTION OVERVIEW

Figure 1A:
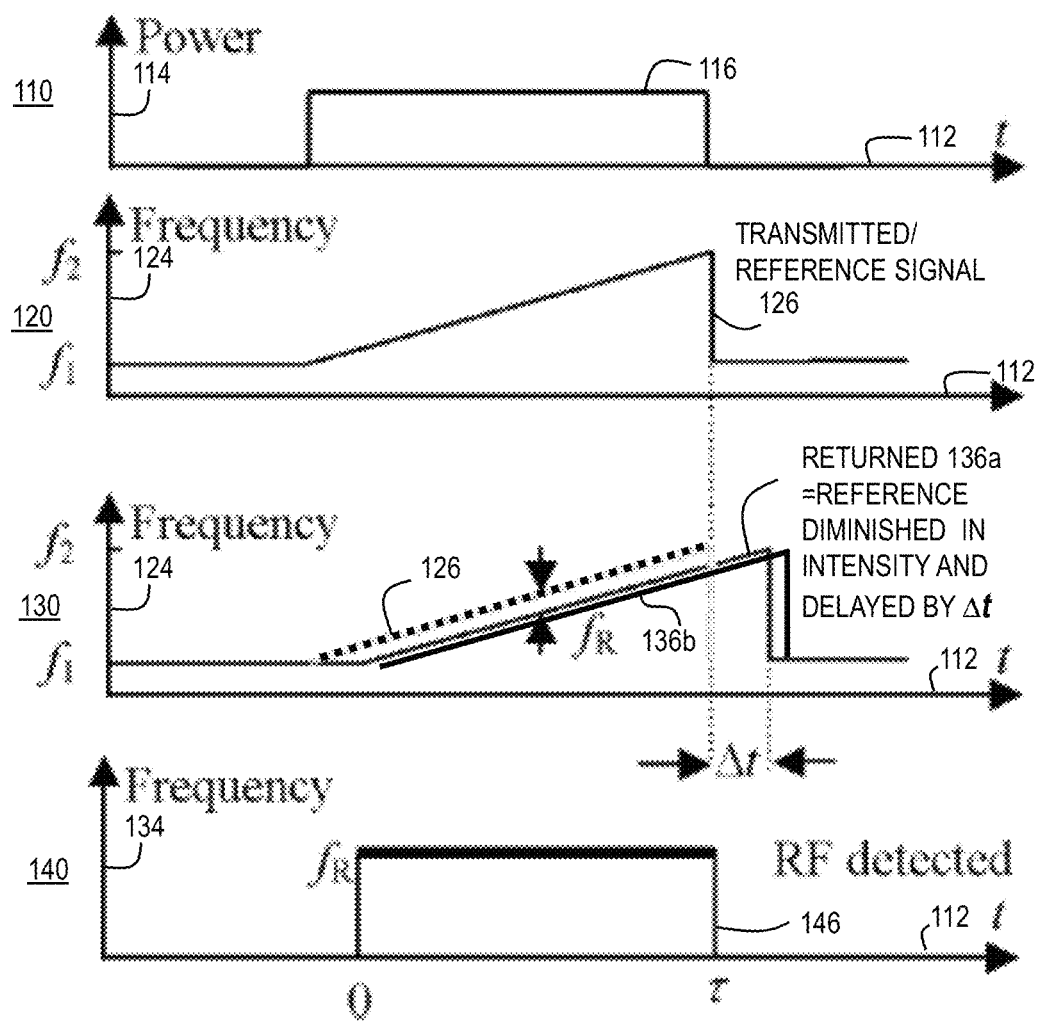
FIG. 1A is a set of graphs that illustrates an example optical chirp measurement of range, according to an embodiment.

FIG. 1A is a set of graphs 110, 120, 130, 140 that illustrates an example optical chirp measurement of range, according to an embodiment. The horizontal axis 112 is the same for all four graphs and indicates time in arbitrary units, on the order of milliseconds (ms, 1 ms=$10^{-3}$ seconds). Graph 110 indicates the power of a beam of light used as a transmitted optical signal. The vertical axis 114 in graph 110 indicates power of the transmitted signal in arbitrary units. Trace 116 indicates that the power is on for a limited pulse duration, $\tau$ starting at time 0. Graph 120 indicates the frequency of the transmitted signal. The vertical axis 124 indicates the frequency transmitted in arbitrary units. The trace 126 indicates that the frequency of the pulse increases from $f_1$ to $f_2$ over the duration r of the pulse, and thus has a bandwidth $B=f_2-f_1$. The frequency rate of change is $(f_2-f_1)/\tau$.

The returned signal is depicted in graph 130 which has a horizontal axis 112 that indicates time and a vertical axis 124 that indicates frequency as in graph 120. The chirp 126 of graph 120 is also plotted as a dotted line on graph 130. A first returned signal is given by trace 136a, which is just the transmitted reference signal diminished in intensity (not shown) and delayed by $\Delta t$. When the returned signal is received from an external object after covering a distance of 2R, where R is the range to the target, the returned signal start at the delayed time $\Delta t$ is given by 2R/c, were c is the speed of light in the medium (approximately $3\times10^8$ meters per second, m/s). Over this time, the frequency has changed by an amount that depends on the range, called $f_R$, and given by the frequency rate of change multiplied by the delay time. This is given by Equation 1a.

$$f_R = (f_2 - f_1)/\tau * 2R/c = 2BR/c\tau \tag{1a}$$

The value of $f_R$ is measured by the frequency difference between the transmitted signal 126 and returned signal 136a in a time domain mixing operation referred to as de-chirping. So the range R is given by Equation 1b.

$$R = f_R \; c \; \tau/2B \tag{1b}$$

Of course, if the returned signal arrives after the pulse is completely transmitted, that is, if 2R/c is greater than $\tau$, then Equations 1a and 1b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 1b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 130 by trace 136b. This will have a different measured value of $f_R$ that gives a different range using Equation 1b. In some circumstances, multiple returned signals are received.

Graph 140 depicts the difference frequency $f_R$ between a first returned signal 136a and the reference chirp 126. The horizontal axis 112 indicates time as in all the other aligned graphs in FIG. 1A, and the vertical axis 134 indicates frequency difference on a much expanded scale. Trace 146 depicts the constant frequency $f_R$ measured during the transmitted chirp, which indicates a particular range as given by Equation 1b. The second returned signal 136b, if present, would give rise to a different, larger value of $f_R$ (not shown) during de-chirping; and, as a consequence yield a larger range using Equation 1b.

A common method for de-chirping is to direct both the reference optical signal and the returned optical signal to the same optical detector. The electrical output of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990. The disadvantage is that the digitizer bandwidth requirement is generally higher. The positive aspects of coherent detection are otherwise retained.

Figure 1B:
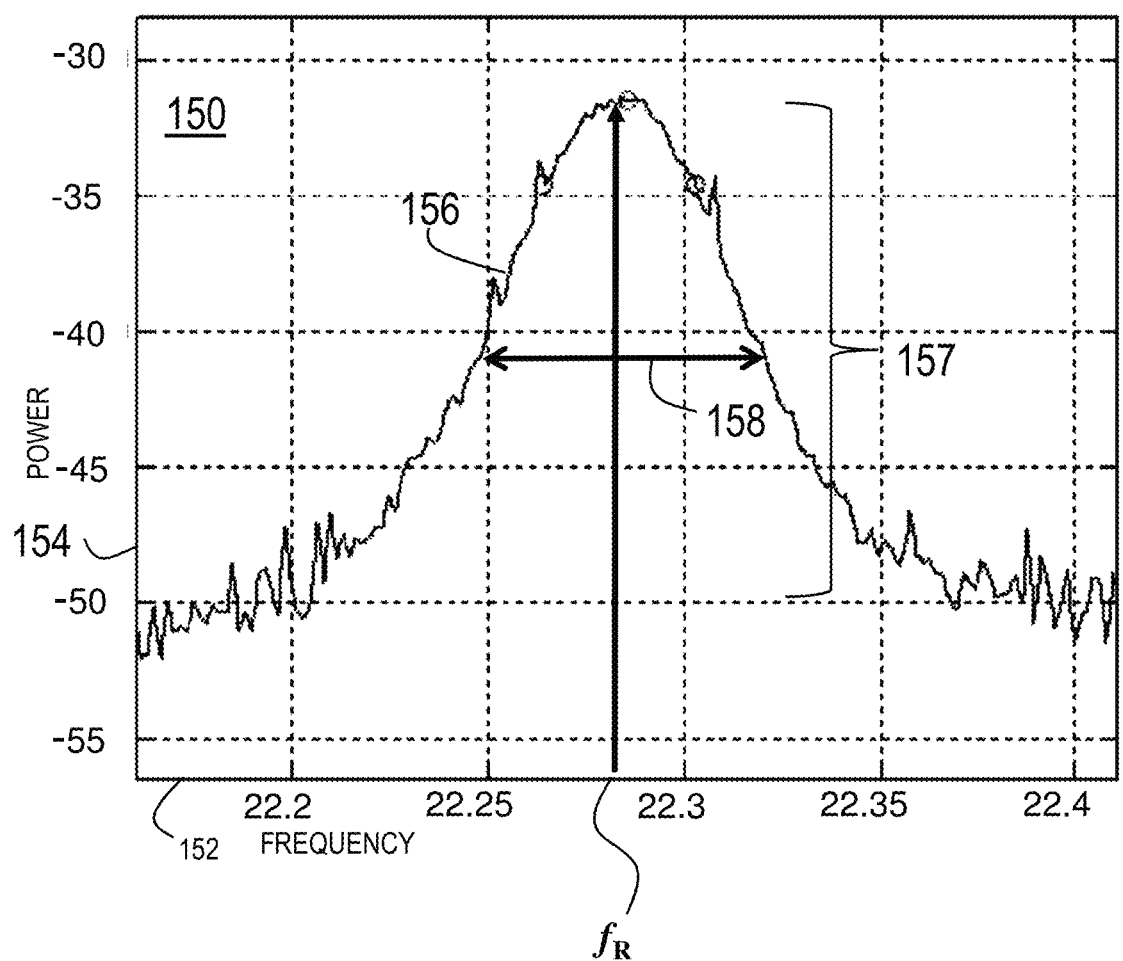
FIG. 1B is a graph that illustrates an example measurement of a beat frequency resulting from de-chirping, which indicates range, according to an embodiment.

FIG. 1B is a graph that illustrates an example measurement of a beat frequency resulting from de-chirping, which indicates range, according to an embodiment. The horizontal axis 152 indicates frequency in Megahertz; and the vertical axis indicates returned signal power density $I_R$ relative to transmitted power density $I_T$ in decibels (dB, Power in dB=20 log($I_R/I_T$)). Trace 156 is the Fourier transform of the electrical signal output by the optical detector, such as produced by a FFT circuit and is based on data published by Adany et al., 2009. The horizontal location of the peak gives $f_R$ and is used to estimate the range, using Equation 1b. In addition, other characteristics of the peak can be used to describe the returned signal. For example, the power value at the peak is characterized by the maximum value of trace 156, or, more usually, by the difference 157 (about 19 dB in FIG. 1B) between the peak value (about −31 dB in FIG. 1B) and a noise floor (about −50 dB in FIG. 1B) at the shoulders of the peak; and, the width of the peak is characterized by the frequency width 158 (about 0.08 MHz in FIG. 1B) at half maximum (FWHM). If there are multiple discernable returns, there will be multiple peaks in the FFT of the electrical output of the optical detector, likely with multiple different power levels and widths. Any method may be used to automatically identify peaks in traces, and characterize those peaks by location, height and width. For example, in some embodiments, FFTW or peak detection by MAT-LAB—Signal Processing Toolbox is used, available from MATLAB™ of MATHWORKS™ of Natick, Massachusetts. One can also use custom implementations that rely on FFTW in CUDA and custom peak detection in CUDA™ available from NVIDIA™ of Santa Clara, California. Custom implementations have been programmed on field programmable gate arrays (FPGAs). A commonly used algorithm is to threshold the range profile and run a center of mass algorithm, peak fitting algorithm (3-point Gaussian fit), or nonlinear fit of the peak for some function (such as a Gaussian) to determine the location of the peak more precisely.

If the object detected (the source) is moving at velocity vs and the LIDAR system (the observer) is moving at velocity $v_o$ on the vector connecting the two, then the returned signal may be Doppler shifted and the beat frequency detected $f_R$ is also shifted, which can lead to errors in the detected range. In many circumstances, a shape of the object being detected is identified based on the relative location of multiple returns. Thus the shape of the object may be in error and the ability to identify the object may be compromised.

The observed frequency f' of the return differs from the correct frequency f of the return by the Doppler effect and is approximated by Equation 2a.

$$f' = \frac{(c + v_o)}{(c + v_s)} f \qquad (2a)$$

Where c is the speed of light in the medium. Note that the two frequencies are the same if the observer and source are moving at the same speed in the same direction on the vector between the two. The difference between the two frequencies, Δf=f'−f, is the Doppler shift, D, which constitutes an error in the range measurement, and is given by Equation 2b.

$$D = \left[\frac{(c + v_o)}{(c + v_s)} - 1\right] f \qquad (2b)$$

Note that the magnitude of the error increases with the frequency f of the signal. Note also that for a stationary LIDAR system ($v_o$=0), for a target moving at 10 meters a second ($v_o$=10), and visible light of frequency about 500 THz, then the size of the error is on the order of 16 MHz which is 75% of the size of $f_R$, which is about 22 MHz in FIG. 1B, leading to a 75% error in $f_R$ and thus a 75% error in range. In various embodiments, the Doppler shift error is detected and used to correct the range as described herein.

2. CHIRPED DETECTION HARDWARE OVERVIEW

Figure 2A:
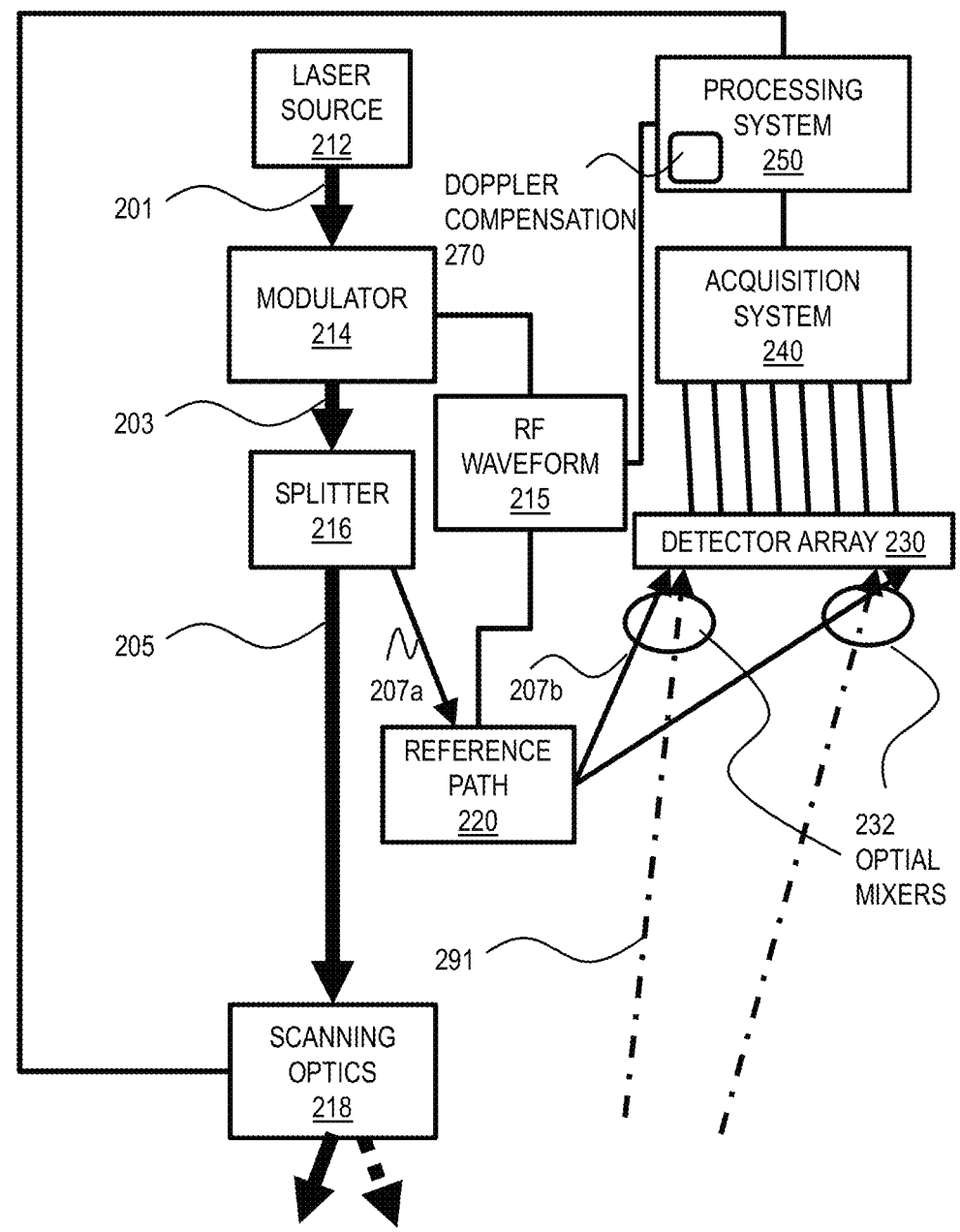
FIGS. 2A and 2B are block diagrams that illustrate example components of a high resolution LIDAR system, according to various embodiments.
Figure 2B:
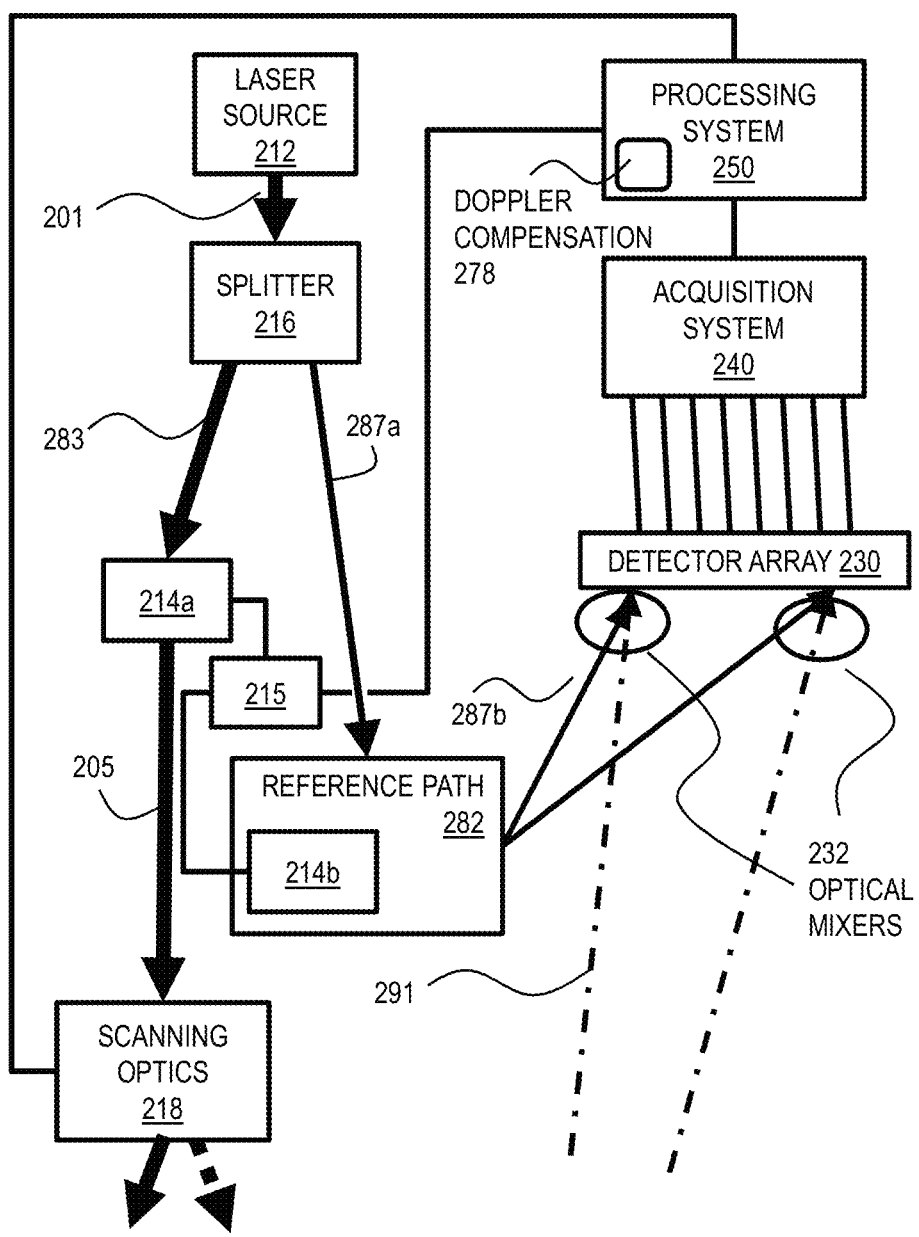

In order to depict how the chirped detection approach is implemented, some generic and specific hardware approaches are described. FIG. 2A and FIG. 2B are block diagrams that illustrate example components of a high resolution LIDAR system, according to various embodiments. In FIG. 2A, a laser source 212 emits a carrier wave 201 that is frequency modulated in the modulator 214 based on input from a RF waveform generator 215 to produce a pulse that has a bandwidth B and a duration t. In some embodiments, the RF waveform generator 215 is software controlled with commands from processing system 250. A splitter 216 splits the modulated optical waveform into a transmitted signal 205 with most of the energy of the beam 203 and a reference signal 207 with a much smaller amount of energy that is nonetheless enough to produce good heterodyne or homodyne interference with the returned light 291 scattered from a target (not shown). In some embodiments, the transmitted beam is scanned over multiple angles to profile any object in its path using scanning optics 218.

The reference beam is delayed in a reference path 220 sufficiently to arrive at the detector array 230 with the scattered light. In some embodiments, the splitter 216 is upstream of the modulator 214, and the reference beam 207 is unmodulated. In some embodiments, the reference signal is independently generated using a new laser (not shown) and separately modulated using a separate modulator (not shown) in the reference path 220 and the RF waveform from generator 215. In some embodiments, as described below with reference to FIG. 2B, a different modulator is used; but, only one laser source 212 is used for both transmitted and reference signals to ensure coherence. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some embodiments, the target is close enough and the pulse duration long enough that the returns sufficiently overlap the reference signal without a delay. In some embodiments, the reference signal 207b is optically mixed with the return signal 291 at one or more optical mixers 232.

In various embodiments, multiple portions of the target scatter a respective returned light 291 signal back to the detector array 230 for each scanned beam resulting in a point cloud based on the multiple ranges of the respective multiple portions of the target illuminated by multiple beams and multiple returns. The detector array is a single or balanced pair optical detector or a 1D or 2D array of such optical detectors arranged in a plane roughly perpendicular to returned beams 291 from the target. The phase or amplitude of the interface pattern, or some combination, is recorded by acquisition system 240 for each detector at multiple times during the pulse duration t. The number of temporal samples per pulse duration affects the down-range extent. The number is often a practical consideration chosen based on pulse repetition rate and available camera frame rate. The frame rate is the sampling bandwidth, often called "digitizer frequency." Basically, if X number of detector array frames are collected during a pulse with resolution bins of Y range width, then a X*Y range extent can be observed. The acquired data is made available to a processing system 250, such as a computer system described below with reference to FIG. 8, or a chip set described below with reference to FIG. 9. In some embodiments, the acquired data is a point cloud based on the multiple ranges of the respective multiple portions of the target.

A Doppler compensation module 270 determines the size of the Doppler shift and the corrected range based thereon. In some embodiments, the Doppler compensation module 270 controls the RF waveform generator 215.

FIG. 2B depicts an alternative hardware arrangement that allows software controlled delays to be introduced into the reference path that produces the LO signal. The laser source 212, splitter 216, transmit signal 205, scanning optics 218, optical mixers 232, detector array 230, acquisition system 240 and processing system 250 are as described above with reference to FIG. 2A. In FIG. 2B, there are two separate optical modulators, 214a in the transmit path and 214b in the reference path to impose the RF waveform from generator 215 onto an optical carrier. The splitter 216 is moved between the laser source 212 and the modulators 214a and 214b to produce optical signal 283 that impinges on modulator 214a and lower amplitude reference path signal 287a that impinges on modulator 214b in a revised reference path 282. In this embodiment, the light 201 is split into a transmit (TX) path beam 283 and reference/local oscillator (LO) path beam 287a before the modulation occurs; and, separate modulators are used in each path. With the dual modulator approach, either path can be programmed with chirps at offset starting frequencies and/or offset starting times. This can be used to allow the system 280 to garner range delay effects for chirp Doppler compensation. By shifting the delay used in each range gate, the system can unambiguously measure with high resolution despite other systems limitations (detector and digitizer bandwidth, measurement time, etc.). Thus, in some embodiments, a revised Doppler compensation module 278 controls the RF waveform generator 215 to impose the delay time appropriate for each Doppler shift produced by the Doppler compensation module described below. The software controlled delay reference signal 287b is then mixed with the return signals 291, as described above. In other embodiments, the software controlled delay of the LO reference path 282 allows an adaptive scanning approach to be adaptive in the down-range dimension as well.

For example, in some embodiments, the laser used was actively linearized with the modulation applied to the current driving the laser. Experiments were also performed with electro-optic modulators providing the modulation. The system is configured to produce a chirp of bandwidth B and duration t, suitable for the down-range resolution desired, as described in more detail below for various embodiments. For example, in some illustrated embodiments, a value for B of about 90 GHz and t of about 200 milliseconds (ms, 1 ms=$10^{-3}$ seconds) were chosen to work within the confines of the relatively low detector array frame rate in the experiments performed. These choices were made to observe a reasonably large range window of about 30 cm, which is often important in determining a shape of an object and identification of the object. This technique will work for chirp bandwidths from 10 MHz to 5 THz. However, for the 3D imaging applications, typical ranges are chirp bandwidths from about 300 MHz to about 20 GHz, chirp durations from about 250 nanoseconds (ns, ns=$10^{-9}$ seconds) to about 1 millisecond (ms, 1 ms=$10^{-3}$ seconds), ranges to targets from about 0 meters to about 20 km, spot sizes at target from about 3 millimeters (mm, 1 mm=$10^{-3}$ meters) to about 1 meter (m), depth resolutions at target from about 7.5 mm to about 0.5 m. It is noted that the range window can be made to extend to several kilometers under these conditions and that the Doppler resolution can also be quite high (depending on the duration of the chirp). Although processes, equipment, and data structures are depicted in FIG. 2 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

FIG. 3A is a block diagram that illustrates example components of a heterodyne chirped LIDAR system 300a, according to an embodiment. This system 300a, modified from that described in U.S. Pat. No. 7,742,152, uses electronic de-chirping. Although an object 390 is depicted to illustrate operation of the system 300a, the object 390 is not part of the system 300a. System 300a includes laser 301, modulator 310, telescope as a scanning optical coupler 320, balanced photodetector 330, processing circuitry 340, waveform generator 350 that produces an FM chirp of bandwidth B and duration r, power splitter 351, de-chirping mixer 360, and acoustic-optic modulator 370. In this system, the source laser 301 output beam is split by beam splitter 302 into two parts; one part is modulated by modulator 310 based on the FM chirp from power splitter 351 and operational amplifier 352a to produce beam 305 that is fed to the telescope.

The other part of the beam, beam 307a is used to generate a local oscillator (LO) for coherent detection. An acoustic speaker produces an acoustic signal with frequency fm to drive an acousto-optic modulator (AOM) 370 to shift the optical frequency by fm in beam 307b, which serves as an intermediate frequency (IF) for heterodyne detection. Optical coupler 322 directs beam 307b onto one of the balanced photodetector 330.

A return optical signal 391 is also directed by optical coupler 322 to the other part of the balanced photodetector. The balanced photodiode 330 rejects the direct detection component. The output electrical signal is amplified in operational amplifier 344a and the IF signal is selected by a bandpass filter 341 and detected by a Schottky diode 342 which recovers the baseband waveform. The resulting electrical signal is directed through low pass filter 343 and operational amplifier 344b.

A de-chirping mixer compares this detected signal with the original chirp waveform output by power splitter 351 and operational amplifier 352b to produce an electrical signal with the beat frequency that depends on the frequency difference between the RF reference waveform and the detected waveform. Another operational amplifier 344c and a FFT process 345 is used to find the beating frequency. Processor 346 is programmed to do data analysis. Coherent detection systems like 300a significantly improve receiver signal to noise ratio (SNR) compared to direct detection of pulse travel time, however, at the cost of greatly increased system complexity. The electrical components from operational amplifier 344a and de-chirping mixer 360 through processor 346 constitute a signal processing component 340.

According to the illustrated embodiment, the light beam emitted from optical coupler 320 impinges on one or more objects 390 with a finite beam size that illuminates an illuminated portion 392 of the one or more objects. Backscattered light from an illuminated portion is returned through the telescope to be directed by optical coupler 322 onto the optical detector, such as one photodiode of a balanced photodetector 330. The one or more objects are moving relative to the system 300a with object velocity components 394, which can differ for returns from different parts of the illuminated portion. Based on this motion, the frequency of a signal detected by system 300a differs from the frequency based solely on the range. The processor 346 includes a Doppler compensation module 380, as described below, to detect the Doppler effect, and to correct the resulting range for the Doppler effect.

FIG. 3B is a block diagram that illustrates example components of a homodyne chirped LIDAR system 300b, according to an embodiment. This system 300b, modified from that described in U.S. Pat. No. 7,742,152, uses photonic de-chirping and simplifies the RF components. Although an object 390 is depicted to illustrate operation of the system 300b, the object 390 is not part of the system 300b. The system 300b includes waveform generator 350, laser 301, modulator 310, splitter 302 downstream of the modulator 310, telescope used as scanning optical coupler 320, balanced photodetector 330, and processing circuitry 360.

In this system, both the optical signal and the local oscillator LO are driven by the same waveform generator 350 and amplified in operational amplifier 352. The beam output by the modulator 310 is split by beam splitter 302 to a beam part 305 and a beam part 307c. The beam part 305, with most of the beam energy, e.g., 90% or more, is transmitted through the optical coupler 320 to illuminate the illuminated portion 392 of the object 390 moving with velocity component 394, as described above. The beam part 307c is delayed a desired amount in delay 308 to produce the reference signal 307d. In some embodiments, there is no delay and delay 308 is omitted. The reference signal 307d and the return signal 309 from the telescope or other optical coupler 320 are directed to the photodetector 330 by optical couplers 322. In some embodiments, described in more detail below, a frequency shifter 318 is added to the optical path of the transmitted signal 305 before transmission through the coupler 320. In other embodiments described below, the frequency shifter 318 is disposed in the optical path of the return signal 309 after passing through the coupler 320.

The de-chirping process is accomplished within the balanced photodiode 330 and therefore eliminates the need of de-chirping mixing and the associated RF processing. Because the original chirp optical waveform, which is carried by the LO, beats with its delayed version at the photodiode as indicated, target distance can be directly obtained by a frequency analysis in an FFT component 345 of the photocurrent signal output by operational amplifier 344. Processor 362 is programmed to do data analysis. The processor 362 includes a Doppler compensation module 380, as described below, to detect the Doppler effect, and to correct the resulting range for the Doppler effect. The electrical components from operational amplifier 344 through processor 362 constitute a signal processing component 360. Considering that shot noise is the dominant noise with coherent detection, SNR at the beating frequency is reduced compared to SNR of direct detection and SNR of the system 300a.

3. DOPPLER EFFECT DETECTION OVERVIEW

Figure 4A:
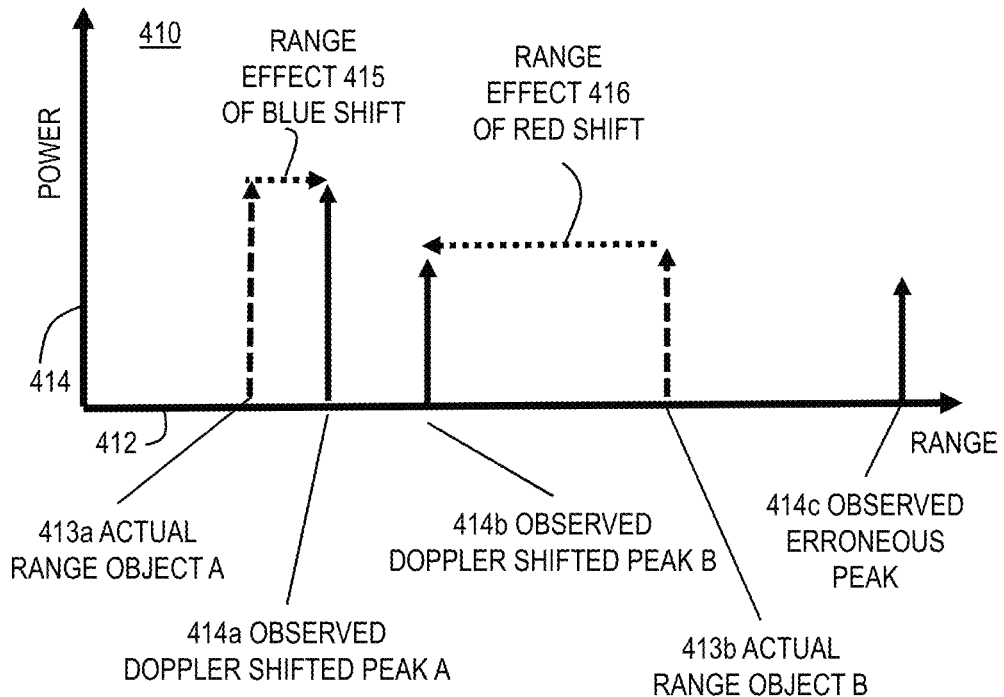
FIG. 4A is a block diagram that illustrates an example graph showing ranges, based on beat frequency peaks from an up chirp LIDAR system, to several targets when the targets are moving, according to an embodiment.

FIG. 4A is a block diagram that illustrates an example graph 410 showing range, based on beat frequency peaks from an up chirp LIDAR system, to several objects when the objects are moving, according to an embodiment. The horizontal axis 412 indicates range in arbitrary units based on beat frequency, and the vertical axis 414 indicates peak power in relative units. Because the chirp is an up chirp (higher frequencies at later times) an increase in frequency is translated into an increase in travel time and therefore an increase in range. A beat frequency is plotted as an arrow located at the range associated with the beat frequency with a height that indicates relative power of the peak. Three observed peaks 414a, 414b and 414c are indicated by solid arrows at the respective ranges. The last peak 414c, due to error, will be discussed in more detail below.

The first observed peak 414a is due to a first scatterer moving toward the LIDAR system at a speed sufficient to introduce a shift toward higher frequencies, called a blue shift. The range effect 415 of the blue shift is depicted. Since the chirp is an up chirp, as depicted in graph 120 of FIG. 1A, the increase in frequency is associated with an increased range, and the actual position 413a is to the left of the inferred range. The object is actually at a range that, if there were no Doppler effect, would be at a range 413a. But neither the blue shift range effect 415 nor the actual range 413a is known to the LIDAR system data processing component.

In contrast, the second observed peak 414b is due to a second scatterer moving away from the LIDAR system at a speed sufficient to introduce a shift toward lower frequencies, called a red shift. The range effect 416 of the red shift is depicted. Since the chirp is an up chirp, the decrease in frequency is associated with a decreased range, and the actual position 413b is to the right of the inferred range. The object is actually at a range that, if there were no Doppler effect, would be at a range 413b. But neither the red shift range effect 416 nor the actual range 413b is known to the LIDAR system data processing component.

One approach to determine the size of the Doppler effect on range is to determine range once with an up chirp and again using a down chirp, in which the transmitted optical signal decreases in frequency with time. With a down chirp transmitted signal, the later arrivals have lower frequencies rather than higher frequencies and each red shift, or blue shift, would have the opposite effect on range than it does with an up chirp transmitted signal. The two oppositely affected ranges can be combined, e.g., by averaging, to determine a range that has reduced or eliminated Doppler effect. The difference between the two ranges can indicate the size of the Doppler effect (e.g., the range effect can be determined to be half the difference in the two ranges).

Figure 4B:
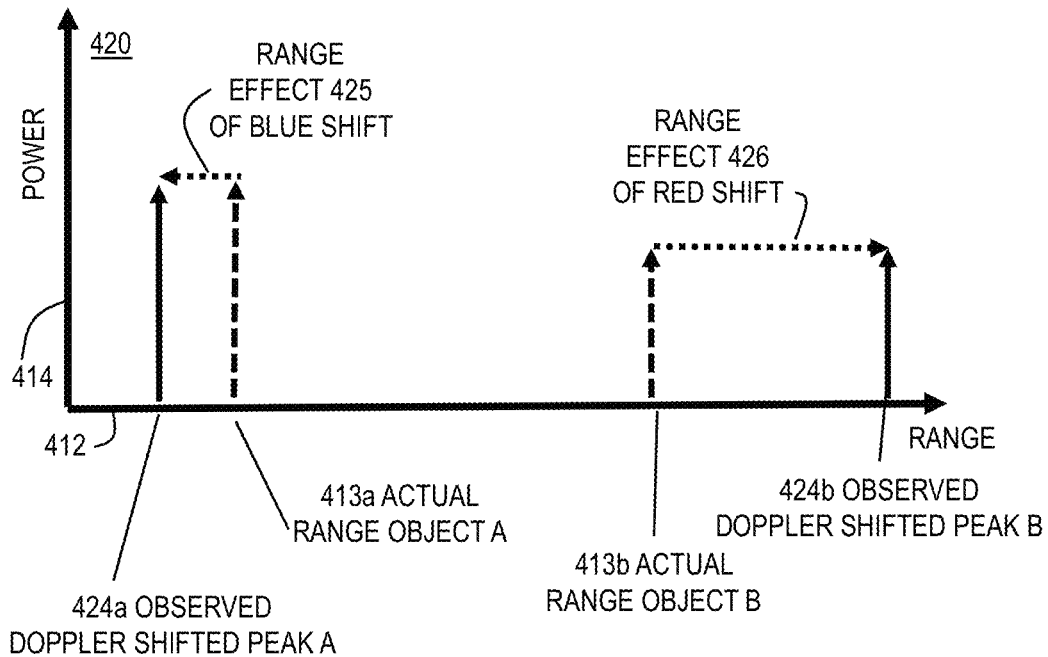
FIG. 4B is a block diagram that illustrates an example graph showing ranges, based on beat frequency peaks from a down chirp LIDAR system, to several targets when the targets are moving, according to an embodiment.

FIG. 4B is a block diagram that illustrates an example graph 420 showing range, based on beat frequency peaks from a down chirp LIDAR system, to several objects when the objects are moving, according to an embodiment. The horizontal axis 412 and vertical axis 414 are as described above. Because the chirp is a down chirp (lower frequencies at later times) a decrease in frequency is translated into an increase in travel time and therefore an increase in range. Only two observed peaks 424a and 424b are indicated by solid arrows at the respective ranges.

As stated above, the first observed peak 414a is due to the first scatterer moving toward the LIDAR system at a speed sufficient to introduce a shift toward higher frequencies, called a blue shift. The range effect 425 of the blue shift is different than for the up chirp; the range effect goes in the opposite direction. Since the chirp is a down chirp, the increase in frequency is associated with a decreased range, and the actual position 413a, the same range as in graph 410, is to the right of the inferred range. As also stated above, the second observed peak 424b is due to a second scatterer moving away from the LIDAR system at a speed sufficient to introduce a shift toward lower frequencies, called a red shift. The range effect 426 of the red shift is toward longer ranges. The object is actually at a range 413b to the left, closer, than the inferred range.

As stated above, the two oppositely affected ranges can be combined, e.g., by averaging, to determine a range that has reduced or eliminated Doppler effect. As can be seen, a combination of range 414a with 424a, such as an average, would give a value very close to the actual range 413a. Similarly, a combination of range 414b with 424b, such as an average, would give a value very close to the actual range 413b. The magnitude of the range effect 415 for object A (equal to the magnitude of the range effect 425 for object A) can be determined to be half the difference of the two ranges, e.g., ½* (range of 414a-range of 425a). Similarly, the magnitude of the range effect 416 for object B (equal to the magnitude of the range effect 426 for object B) can be determined to be half the difference of the two ranges, e.g., ½* (range of 424b-range of 414b). In some embodiments, the up-chirp/down-chirp returns are combined in a way that incorporates range extent to the up-chirp/down-chirp peaks detected. Basically, the distributions of the detected peak on the up-chirp/down-chirp return is combined (many different statistical options) in an effort to reduce the variance of the Doppler estimate.

This correction depends on being able to pair a peak in the up chirp returns with a corresponding peak in the down chirp returns. In some circumstances this is obvious. However, the inventors have noted that, because of spurious peaks such as peak 414c, it is not always clear how to automatically determine which peaks to pair, e.g., which of the three peaks of FIG. 4A to pair with each of the two peaks of FIG. 4B. In addition, the number of spurious peaks due to clutter in the field of view or other noise factors and the changes in range associated with a moving object and moving LIDAR system mean that the pairing of peaks is made difficult when up chirp and down chirp transmitted pulses are separated in time.

Figure 5A:
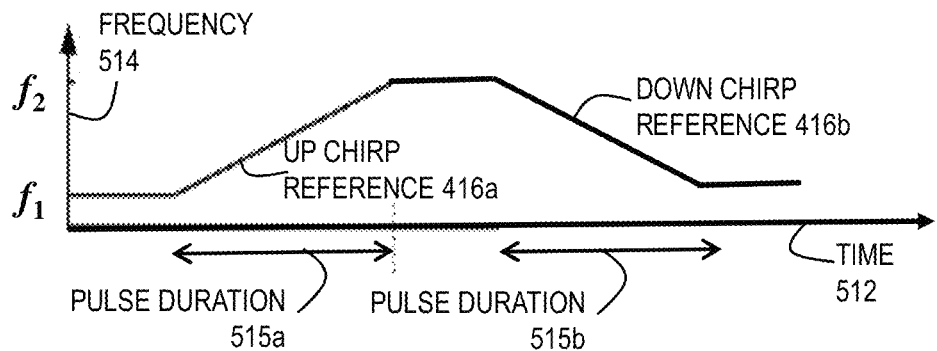
FIG. 5A is a graph that illustrates an example serial up and down chirp transmitted optical signal for a LIDAR system, according to an embodiment.

FIG. 5A is a graph that illustrates an example serial (also called sequential) up and down chirp transmitted optical signal for a LIDAR system, according to an embodiment. The horizontal axis 512 indicates time in arbitrary units; and, the vertical axis 514 indicates frequency of the optical transmitted signal or reference signal in arbitrary units. A first pulse of duration 515a is an up chirp and a second pulse of duration 515b is a down chirp. The pairs of ranges obtained from the up chirp and down chirp can be combined to determine a better estimate of range and the Doppler effect. Any of the LIDAR systems in FIG. 2, FIG. 3A or FIG. 3B can be operated with such sequential up and down chirps. There is no requirement that the bandwidths or pulse duration, or both, be the same for both up chirp and down chirp pulses, as long as each spans the range values of interest for a particular application.

As indicated above, if the sequential range measurements can be successfully paired and averaged, the range and Doppler of the target can be correctly inferred by averaging the range of the sequential measurements. However, the sequential up/down approach leads to errors when the Doppler shift changes between measurements or when a translated beam (e.g., a LIDAR scanner) translates to a new location between measurements which could lead to a change in the objects being measured or a change in the actual range to the same objects, or some combination. As explained in more detail below, a cost function is used to generate a cost matrix that is then used to determine a desirable pairing of ranges from up and down chirps.

In some embodiments, the LIDAR system is changed to produce simultaneous up and down chirps. This approach eliminates variability introduced by object speed differences, or LIDAR position changes relative to the object which actually does change the range, or transient scatterers in the beam, among others, or some combination. The approach then guarantees that the Doppler shifts and ranges measured on the up and down chirps are indeed identical and can be most usefully combined. The Doppler scheme guarantees parallel capture of asymmetrically shifted return pairs in frequency space for a high probability of correct compensation.

Figure 5B:
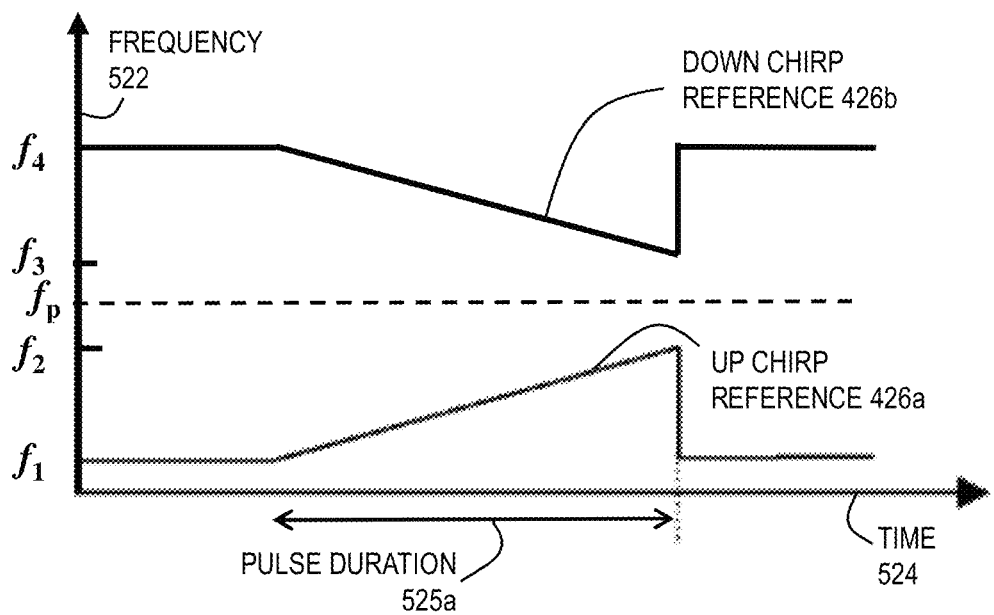
FIG. 5B is a graph that illustrates an example simultaneous up and down chirp transmitted optical signal for a LIDAR system, according to an embodiment.

FIG. 5B is a graph that illustrates an example simultaneous up and down chirp transmitted optical signal for a LIDAR system, according to an embodiment. The horizontal axis indicates time in arbitrary units, not necessarily the same axis limits as in FIG. 5A. For example, in some embodiments, the full temporal range of axis 524 is half the full temporal range of axis 512. The vertical axis 522 indicates frequency of the optical transmitted signal or reference signal in arbitrary units. During a pulse of duration 252a, a light beam comprising two optical frequencies at any time is generated. One frequency increases, e.g., from $f_1$ to $f_2$ while the other frequency simultaneous decreases from $f_4$ to $f_3$. The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1 < f_2 < f_p < f_3 < f_4$. Though, in the illustrated embodiment, the higher frequencies provide the down chirp and the lower frequencies provide the up chirp, in other embodiments, the higher frequencies produce the up chirp and the lower frequencies produce the down chirp.

In some embodiments, two different laser sources are used to produce the two different optical frequencies in each beam at each time. However, in some embodiments, a single optical carrier is modulated by a single RF chirp to produce symmetrical sidebands that serve as the simultaneous up and down chirps. In some of these embodiments, a double sideband Mach-Zehnder modulator is used that, in general, does not leave much energy in the carrier frequency; instead, almost all of the energy goes into the sidebands.

Figure 5C:
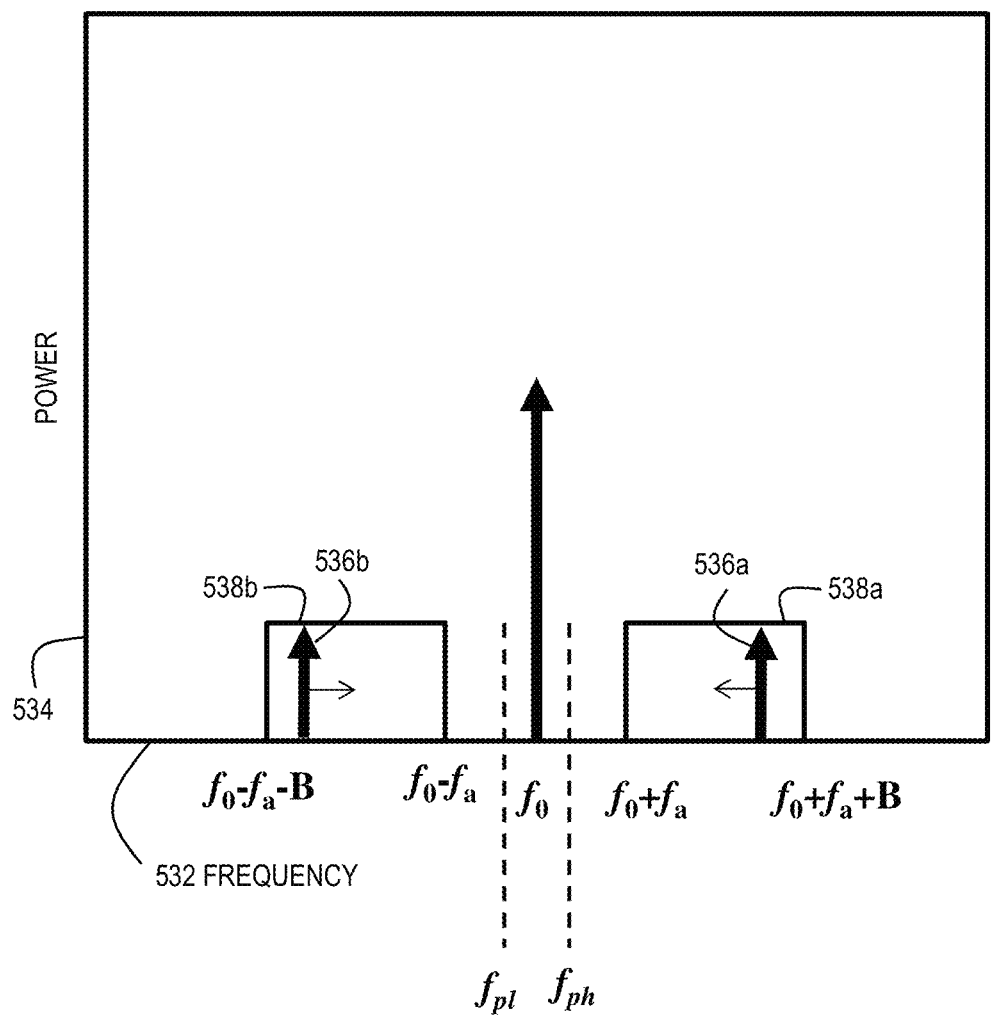
FIG. 5C is a graph that illustrates example first order sidebands produced by a modulator to generate simultaneous up and down chirp transmitted optical signal for a LIDAR system, according to an embodiment.

FIG. 5C is a graph that illustrates example first order sidebands produced by a modulator to generate simultaneous up and down chirp transmitted optical signal for a LIDAR system, according to an embodiment. The horizontal axis 532 indicates frequency of a signal and the vertical axis 534 indicates power of the signal. When an optical carrier $f_0$ is modulated by a RF signal of frequency f, two optical sidebands are produced for each multiple of the RF frequency. The first order sidebands are at the RF frequency f above and below the optical carrier frequency $f_0$ indicated by arrows 536a and 536b. Second order sidebands are produced at 2f above and below the optical carrier $f_0$, etc. Each higher order sideband is reduced in power compared to the previous lower order sideband.

When producing an optical chirp using a RF down chirp varying from fb to fa<fb, the bandwidth B=(fb–fa). The upper sideband varies from $f_0$+fa+B=$f_0$+fb to $f_0$+fa, as indicated by the left pointing arrow on frequency 536a, producing a signal in band 538a. The lower sideband simultaneous varies from $f_0$–fa–B=$f_0$–fb to $f_0$–fa, as indicated by the right pointing arrow on frequency 536b, producing a signal in band 538b. In other embodiments, a RF down chirp is used to modulate the optical carrier, and the frequencies 536a and 536b move through the bands 538a and 538b, respectively, in the opposite directions, e.g., from left to right in band 538a and right to left in band 538b. The returns from the up-chirp and the down chirp are distinguished using different methods in different embodiments. In some preferred embodiments the separation is performed by adding a frequency shift to remove the symmetry of the upper and lower sidebands, as described below. In other embodiment, in which the sidebands are widely enough separated to be optically filtered, the signals from each are split. One signal from each of the reference and return is passed through a low pass filter starting at $f_{pl}$ to filter out the carrier $f_0$ and the high band 538a to obtain the low frequency band 538b. Similarly, one signal from each of the reference and return is passed through a high pass filter starting at $f_{ph}$ to filter out the carrier $f_0$ and the low band 538b to obtain the high frequency band 538a. The two bands are processed as described above to produce the up-chirp ranges and the down-chirp ranges. After pairing the ranges from the up chirp and down chirp, the Doppler effect and the corrected ranges are determined.

As a result of sideband symmetry, the bandwidth of the two optical chirps will be the same if the same order sideband is used. In other embodiments, other sidebands are used, e.g., two second order sideband are used, or a first order sideband and a non-overlapping second sideband is used, or some other combination.

FIG. 3B also illustrates example components for a simultaneous up and down chirp LIDAR system according to one embodiment. In this embodiment, the frequency shifter 318 is added to the optical path of the transmitted beam 305. In other embodiments, the frequency shifter is added instead to the optical path of the returned beam 309 or to the reference path. In general, the frequency shifting element is added on the local oscillator (LO, also called the reference path) side or on the transmit side (before the optical amplifier) as the device (AOM) has some loss associated and it is disadvantageous to put lossy components on the receive side or after the optical amplifier. The purpose of the optical shifter 318 is to shift the frequency of the transmitted signal (or return signal) relative to the frequency of the reference signal by a known amount $\Delta fs$, so that the beat frequencies of the up and down chirps occur in different frequency bands, which can be picked up, e.g., by the FFT component 345, in the analysis of the electrical signal output by the optical detector. For example, if the blue shift causing range effects 415 and 425 of FIG. 4A and FIG. 4B, respectively, is $f_B$, then the beat frequency of the up chirp will be increased by the offset and occur at $f_B+\Delta fs$ and the beat frequency of the down chirp will be decreased by the offset to $f_B-\Delta fs$. Thus, the up chirps will be in a higher frequency band than the down chirps, thereby separating them. If $\Delta fs$ is greater than any expected Doppler effect, there will be no ambiguity in the ranges associated with up chirps and down chirps. The measured beats can then be corrected with the correctly signed value of the known $\Delta fs$ to get the proper up-chirp and down-chirp ranges. In some embodiments, the RF signal coming out of the balanced detector is digitized directly with the bands being separated via FFT. In some embodiments, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Both embodiments offer pathways that match the bands of the detected signals to available digitizer resources.

When selecting the transmit (TX) and local oscillator (LO) chirp waveforms, it is advantageous to ensure that the frequency shifted bands of the system take maximum advantage of available digitizer bandwidth. In general this is accomplished by shifting either the up chirp or the down chirp to have a range frequency beat close to zero.

Figure 5D:
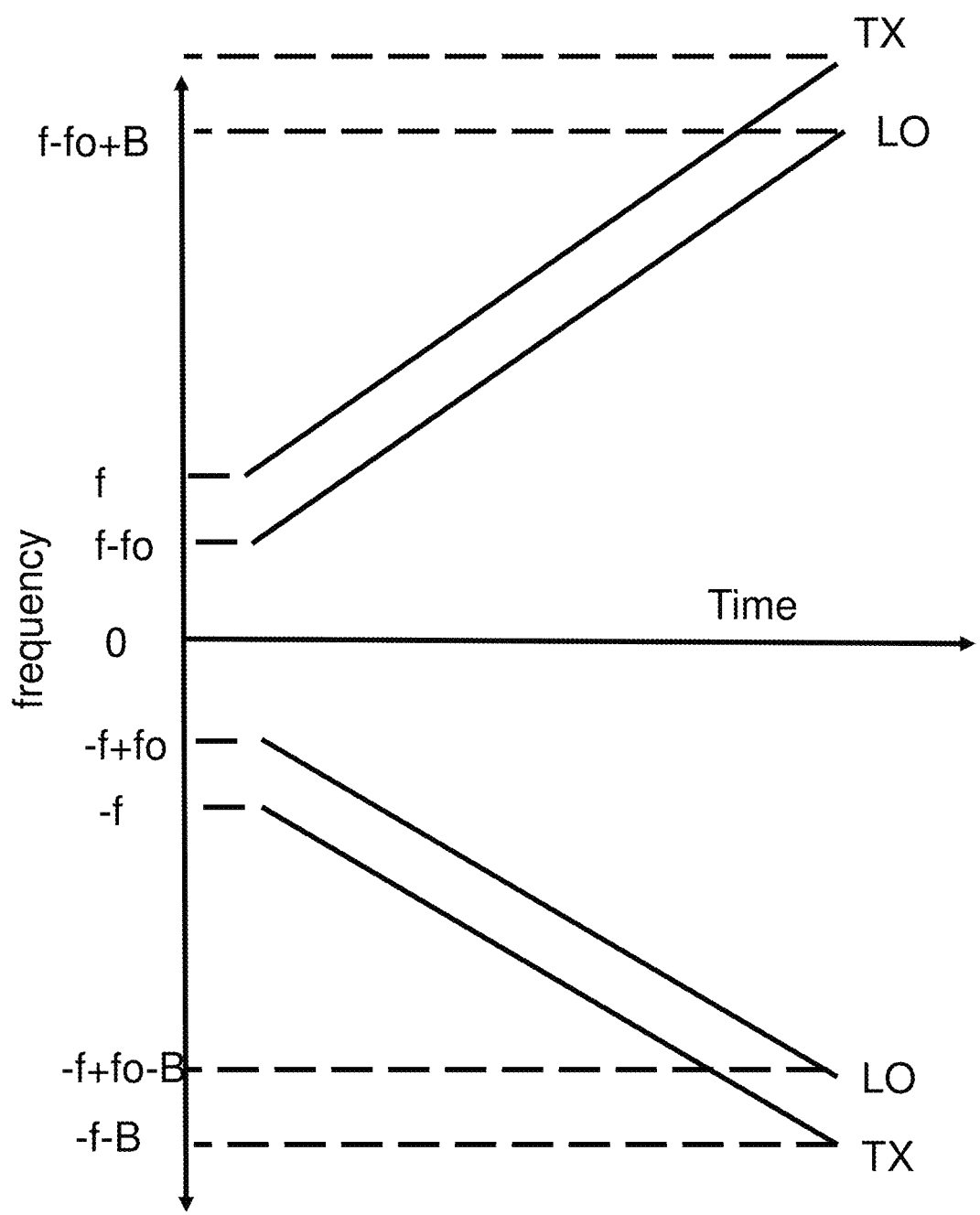
FIG. 5D is a graph that illustrates an example simultaneous up and down chirp transmitted optical signal and reference signal (LO) for a LIDAR system relative to an optical carrier, according to another embodiment.

For example, in another embodiment, the transmitted (TX) signal and the reference (LO) signal are generated independently using upper and lower sidebands on two different modulators on the carrier frequency. FIG. 5D is a graph that illustrates an example simultaneous up and down chirp transmitted optical signal and reference signal (LO) for a LIDAR system relative to an optical carrier, according to another embodiment. The horizontal axis is time in relative units, and the vertical axis is frequency relative to the optical carrier $f_0$ plotted as $f_0$=0. The reference signal (LO) is offset from the transmitted signal (TX) by an offset frequency fo that, because of the side band symmetries, and unlike the examples above, are on opposite sides on the up chirp compared to the down chirp. In the illustrated embodiment, the LO signal frequency is lower than the simultaneous TX signal frequency for the up chirp and the LO signal frequency is higher than the simultaneous TX signal frequency for the down chirp. Thus, the TX up-chirp waveform chirps over bandwidth B from f to f+B; and the LO up-chirp waveform chirps from f–fo to f–fo+B. The down chirps are reflected around the optical carrier frequency plotted as 0.

Figure 5E:
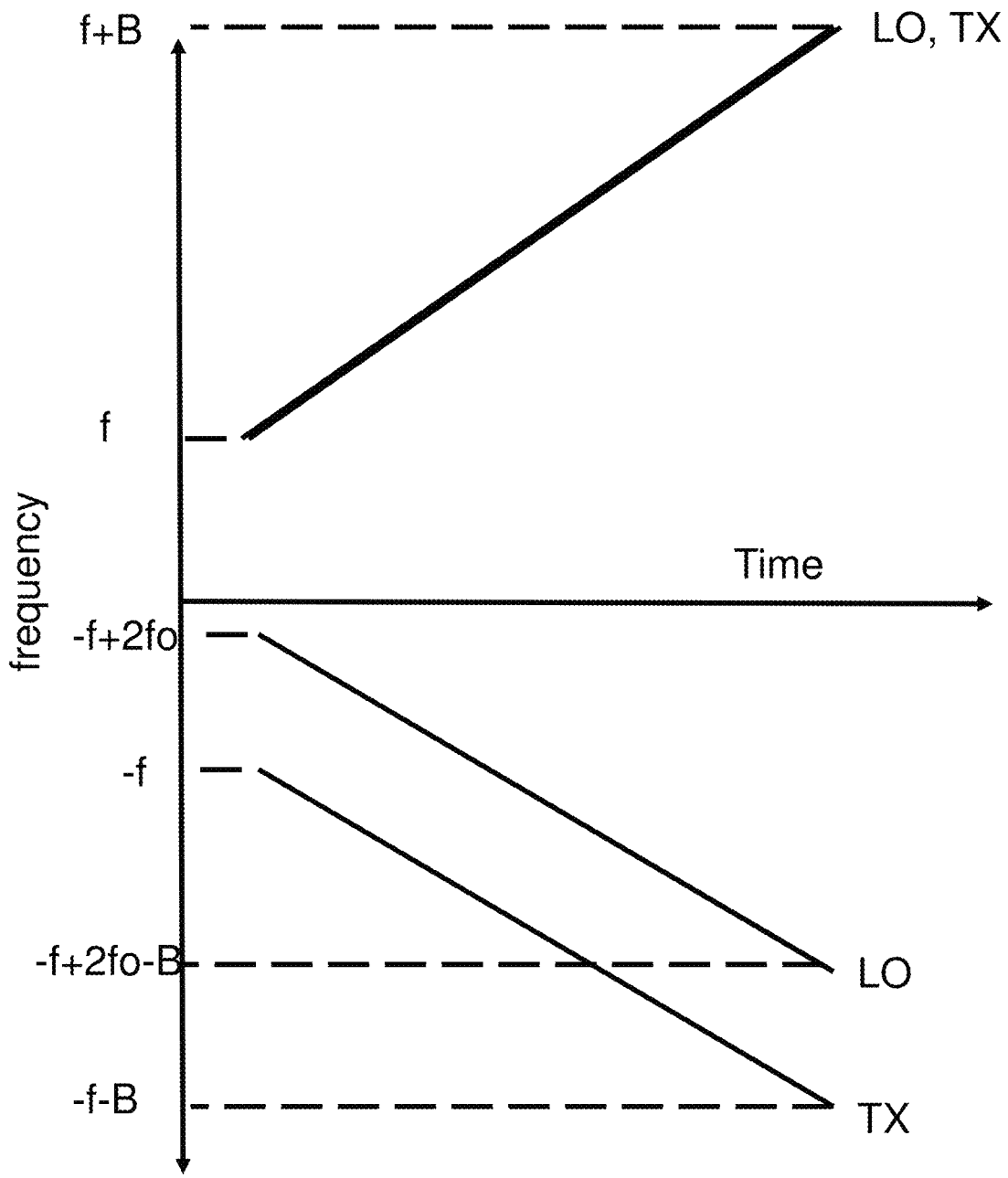
FIG. 5E is a graph that illustrates an example shifted simultaneous up and down chirp transmitted optical signal and reference signal (LO) for a LIDAR system relative to an optical carrier, according to another embodiment.

In this case, to get an up-chirp beat frequency near zero, it makes sense to select the shift frequency $\Delta fs$=fo such that the up chirp is aligned with the transmit. The down chirps will be separated by 2*fo. FIG. 5E is a graph that illustrates an example shifted simultaneous up and down chirp transmitted optical signal and reference signal (LO) for a LIDAR system relative to an optical carrier, according to another embodiment. The horizontal axis is time in relative units, and the vertical axis is frequency relative to the optical carrier $f_0$ plotted as $f_0=0$. Overall this gives rise to an up-chirp beat frequency band for $f_R$ from 0 to 2*fo and a non-overlapping down-chirp beat frequency band for $f_R$ from 2*fo to a system cutoff frequency (probably digitizer limited). If the down chirp beat frequency is too large, a down-mix stage for the large beat frequency band would mix the large beat frequency band down by 2*fo so that it can be digitized at base-band.

Any frequency shifter 318 known in the art may be used. For example, in some embodiments an acousto-optic modulator (AOM) is used; and, in other embodiments, serradyne based phase shifting is used with a phase modulator.

Figure 6:
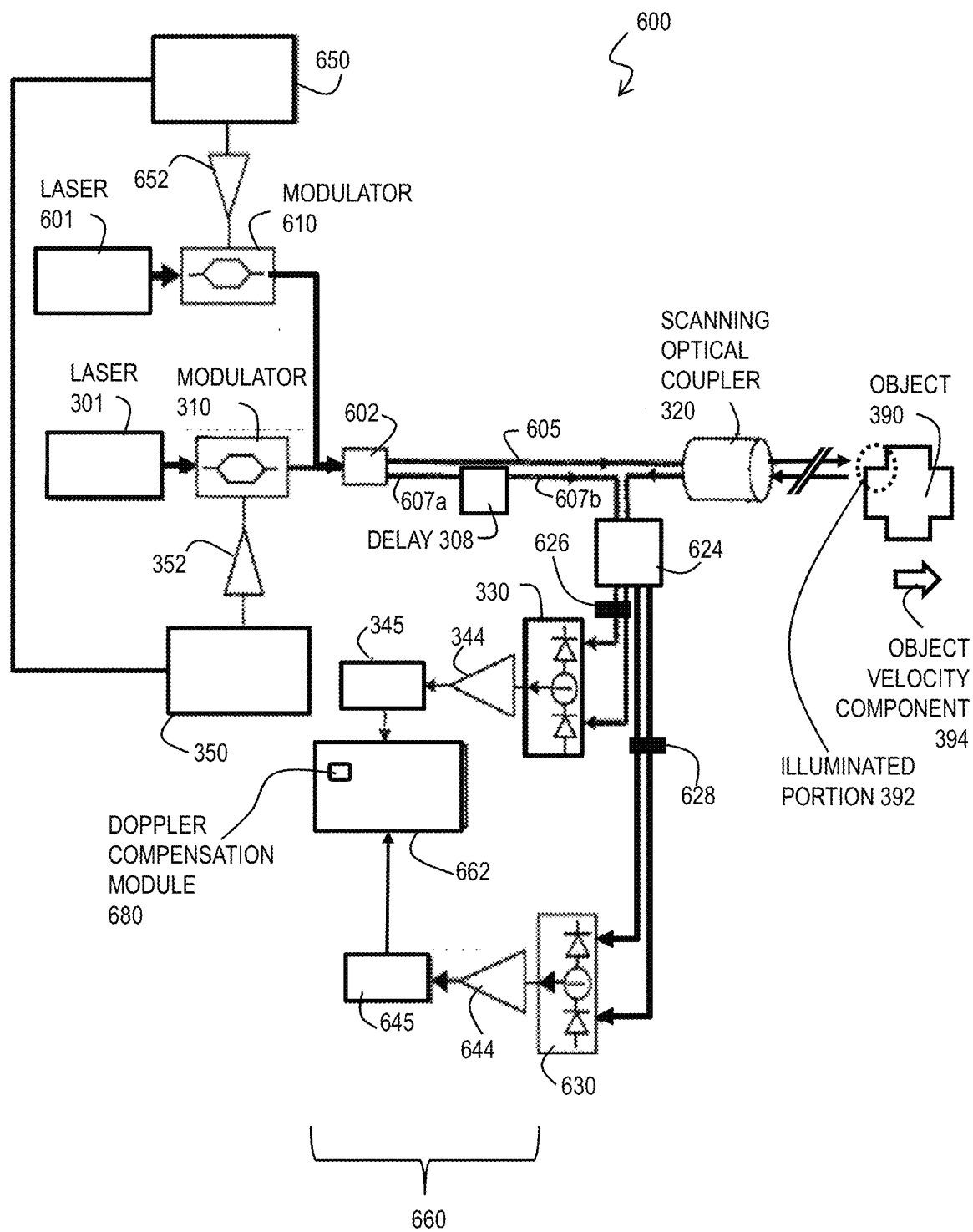
FIG. 6 is a block diagram that illustrates example components for a simultaneous up and down chirp LIDAR system, according to an embodiment.

FIG. 6 is a block diagram that illustrates example components for a simultaneous up and down chirp LIDAR system 600, according to another embodiment. Although an object 390 is depicted to illustrate operation of the system 600, the object 390 is not part of the system 600. System 600 is modified from system 300b in FIG. 3B by adding a second detector and processing for the simultaneous second chirp reference signal and return signal, as described in more detail below. In some embodiments, system 600 is modified from system 300b in FIG. 3B by also adding a second laser 601, second waveform generator 650 and operational amplifier 652 and modulator 610 to generate the second simultaneous chirp signal. However, in some embodiments in which a single modulator with multiple sidebands is used to produce simultaneous up and down chirps, the second laser and components are omitted.

For example, in some embodiments, the laser 601 produces an optical carrier at frequency $f_0$, the waveform generator 650 produces an RF down chirp from $f_b$ to $f_a$, where $f_a<f_b$, with power augmented by operational amplifier 652, to drive modulator 610 to produce the optical carrier frequency $f_0$ and optical sidebands 538a and 538b depicted in FIG. 5C. This provides the simultaneous up and downs chirps depicted in FIG. 5B, where: $f_1=(f_0-f_b)$; $f_2=(f_0-f_a)$; $f_3=(f_0+f_a)$; and $f_4=(f_0+f_b)$ and the up and down chirps are symmetrical. In these embodiments, the laser 301, waveform generator 350, operational amplifier 352 and modulator 310 are omitted.

In either type of embodiments, the optical signal entering beam splitter 602 includes the simultaneous up chirp and down chirp. This beam is split into two beams of identical waveforms but different power, with most of the power, e.g., 90% or more, passing as beam 605 through a scanning optical coupler 320 to impinge on an object 390. The remaining power passes as beam 607a to a delay 308 to add any desired delay or phase or other properties to produce reference signal 607b. In some embodiments, delay 308 is omitted and reference signal 607b is identical to signal 607a.

Optical coupler 624 is configured to split the reference signal into two reference beams, and to split the returned signal received from the object 390 through scanning optical coupler 320 into two returned signals. The beams can be split into equal or unequal power beams. One reference signal and one returned signal pass through low pass filter 626 to remove the optical carrier and high frequency band. The low passed reference and returned signals are directed onto photodetector 330 to produce a beat electrical signal that is amplified in operational amplifier 344 and transformed in FFT component 345 and fed to data analysis module 662. The other reference signal and the other returned signal pass through high pass filter 628 to remove the optical carrier and low frequency band. The high passed reference and returned signals are directed onto photodetector 630 to produce a beat electrical signal that is amplified in operational amplifier 644a and transformed in FFT component 645 and fed to data analysis module 662. The Doppler compensation module 680 matches pairs of the ranges in the up chirp and down chirp paths of system 600, determines the Doppler effects, or corrects the ranges based on a corresponding Doppler effects, or both. In some embodiments, the module 680 also operates a device based on the Doppler effect or Doppler corrected range or some combination. For example, a display device 1214 is operated to produce an image or point cloud of ranges to objects or speed of objects or some combination. The components 344, 345, 644, 645, 662 and 680 constitute a data processing system 660. In many embodiments, the separation of the up and down chirps in the sidebands is less than 1 GHz and not large enough to be cleanly separated using existing optical filters. In such embodiments, the system of FIG. 3B, described, above is used instead of the system of FIG. 6.

As stated above, the third observed peak 414c is an example extraneous peak due to system error that can occur in an actual system in a natural setting and is not associated with a range to any actual object of interest. This can lead to problems in determining which up-chirp range and down-chirp range to pair when determining the Doppler effect or corrected range or both. That is, a complication arises as FM chirp waveform (FMCW) systems resolve returns from all scatterers along a given line of site. In this scenario, any Doppler processing algorithm must effectively deal with the requirement that multiple returns on the up-chirp and down-chirp range profile be paired correctly for compensation. In the case of a single range return, one peak on the "up" and one peak on the "down" would be isolated and correctly paired. The confounding situation arises when multiple peaks exist, from multiple scatterers, on the "up" and "down" side. Which peaks should be paired with which to get the desired compensation effect has to be determined, and preferably is determined using a method that can be implemented to proceed automatically, e.g., on a processor or integrated circuit.

Figures 7A, 7B:
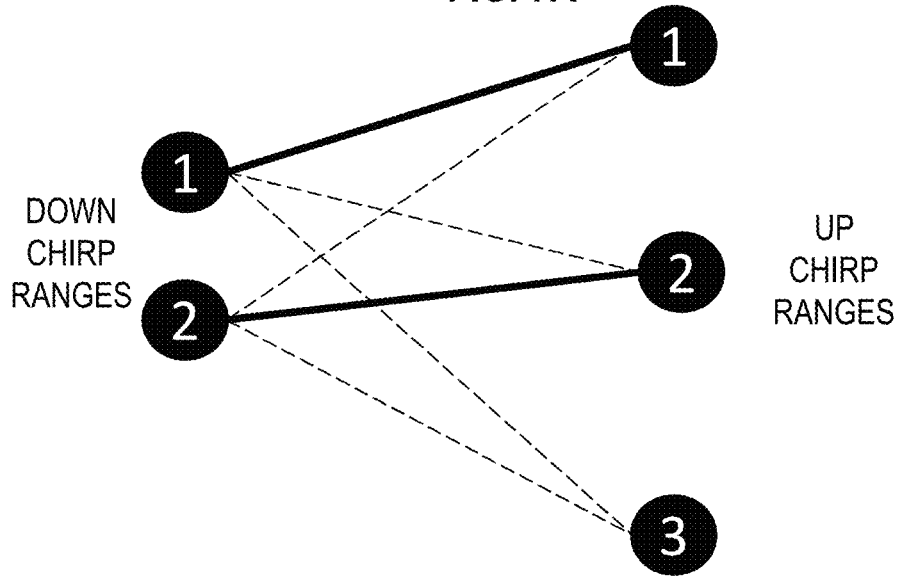
FIG. 7A is a block diagram that illustrates example pairs of up chirp and down-chirp ranges, according to an embodiment.
FIG. 7B is a block diagram that illustrates an example cost matrix with elements corresponding to the example pairs of up chirp and down-chirp ranges depicted in FIG. 7A, according to an embodiment.

Here is demonstrated an approach to automatically pair up-chirp ranges and down-chirp ranges for calculating Doppler effects and Doppler corrected ranges. This approach uses a bi-partite graph matching formulation to achieve correct up/down return parings with high probability. FIG. 7A is a block diagram that illustrates example pairs of up-chirp and down-chirp ranges, according to an embodiment. Each pair includes one up-chirp range and one down-chirp range. This diagram assumes there are two down-chirp ranges, and three up-chip ranges, for example as diagrammed in FIG. 4B and FIG. 4A, respectively, as down-chirp ranges 424a and 424b, and up-chirp ranges 414a, 414b and 414c. There are six possibilities in paring the two down-chirp ranges with the three up-chirp ranges, represented by the lines connecting down-chirp ranges 1 and 2 with each of the three up-chirp ranges 1, 2 and 3.

For each possible pair, a cost is determined. A cost is a measure of dissimilarity between the two ranges in the pair. Any method may be used to evaluate the dissimilarity. For example, in some embodiments, the cost for each pair is a difference in detected ranges for the two ranges. In some embodiments, the cost is a difference in detected peak heights associated with the two ranges. In some embodiments, the cost is a difference in peak widths associated with the two ranges. In some embodiments, the cost is a scalar valued function of two or more of individual dissimilarities, such as range difference, peak height difference, and peak width difference, among others. In some embodiments, the cost is a vector function with two or more elements selected from range difference, peak height difference, and peak width difference, among others. The cost is represented by the symbol $C_{nm}$, where m indicates an index for a down-chirp range and n represents an index for an up-chirp range. FIG. 7B is a block diagram that illustrates an example cost matrix with elements corresponding to the example pairs of up chirp and down-chirp ranges depicted in FIG. 7A, according to an embodiment. In FIG. 7, the indices are reversed, showing the down-chirp range index first, $C_{mn}$.

The set ($S_{up}$) of range returns $R_{i\ up}$ from the up-chirp range profiles and the set ($S_{down}$) of range returns $R_{j\ down}$ from the down-chirp range profiles are determined using Equation 1b and frequencies of peaks selected via a standard thresholding and peak fitting procedure (e.g., peak finding based on height and width of the peak) of the FFT spectrum of the electrical output of the photodetectors.

$$S_{up} = [R_{1up}, R_{2up}, \ldots R_{Nup}] \quad (3a)$$

and $$S_{down} = [R_{1down}, R_{2down}, \ldots R_{Mdown}]$$

with N "up" peaks and M "down" peaks. The two sets of range profiles then are used to define a cost matrix C where each matrix element is a function of the pair $C_{nm}=F(R_{n,up}, R_{m,down})$. A good cost function for static scenes (imager not moving relative to scene) is simply the magnitude of the Doppler effect for the pairing. $F(R_{n,up}, R_{m,down})=|R_{n,up} - R_{m,down}|/2$ where $|\cdot|$ is the absolute value operation. The general approach allows for flexible definition of cost functions. For example, the cost could include other parameters such as the intensity of the set of peaks, the uncompensated range, external information such as imager motion in the imaging space (for mobile scanning), or combinations thereof.

Once the cost matrix C is defined, the approach proceeds with a bipartite graph matching procedure. This procedure often restricts the pairings so that a given up-chirp range can only be paired with a single down-chirp range, and vice versa. Other constraints can be imposed, such as that lines connecting matched pairs do not cross. In some embodiments, the matching process proceeds in a greedy manner whereby the algorithm always chooses the lowest cost pairing, minimum($C_{mn}$), from the set until no further pairings exist. Alternatively, the Hungarian bi-partite graph matching algorithm (e.g., see Munkres, 1957) can be used to generate the optimal "lowest cost" set of pairings averaged over all pairs. In other embodiments, other graph matching methods are used. It has been found that with observed real world scenarios, the greedy approach is both faster and sufficient for the intended purposes. This method was chosen as it limits a peak on either side to be paired with maximum of one peak on the other side. This is the most "physical" interpretation of the pairing procedure as a peak on one side being paired with two on the other side would imply a non-physical or confounding scenario. There are certainly other matching procedures (that were looked at but did not perform as well in the experimental embodiments). For example, a "range ordered" approach sorted the up and down returns according to range and sequentially paired them (from closest to furthest). Extra peaks on either side when one side "ran out of peaks" were discarded. This failed in the common scenario of close peaks with slight Doppler shifts. Similarly "amplitude ordered" sorted the peaks according to amplitude and paired them in descending order of amplitude. This method did not work well because speckle effects in coherent detection cause large variance in the amplitude of detected peaks. This led to many incorrect pairings. The cost matrix approach seems to be the most general way of considering the options and minimizing globally across the set of options. In FIG. 7A, two low cost pairs were determined, represented by the solid lines. Thus one up-chirp range (3) is not paired with either of the two down-chirp ranges.

FIG. 8 is a flow chart that illustrates an example method for using an up and down chirp LIDAR system to compensate for Doppler effects on ranges, according to an embodiment. Although steps are depicted in FIG. 8 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 801, a transceiver, e.g., a LIDAR system, is configured to transmit up and down chirped optical signals. A portion (e.g., 1% to 10%) of each of the up chirp and down chirp signals is also directed to a reference optical path. The transceiver is also configured to receive a backscattered optical signal from any external object illuminated by the transmitted signals. In other embodiments the up chirp and down chirp signals are transmitted simultaneously. In some embodiments, step 801 includes configuring other optical components in hardware to provide the functions of one or more of the following steps as well, as illustrated for example in FIG. 3A or FIG. 3B or FIG. 6, or equivalents. Note that the transmitted signal need not be a beam. A diverging signal will certainly see a lot of different ranges and Doppler values within a single range profile; but, provide no cross range resolution within an illuminated spot. However, it is advantageous to use a narrow beam which provides inherent sparsity that comes with point by point scanning to provide the cross range resolution useful to identify an object.

In some embodiments, the up chirp optical signal is symmetric with the down chirp, that is, they have the same bandwidth, B, and they have the same duration, τ. But a range can be determined for any bandwidth and duration that spans the returns of interest. Thus, in some embodiments, the up chirp optical signals and downs chirp optical signals have different bandwidths, Bu and Bd, respectively, or different durations, τu and τd, respectively, or some combination. In some embodiments, it is convenient to produce slightly different values for B and τ, e.g., by using one first order sideband and one second order sideband of an optical carrier, rather than positive and negative first order sidebands, as depicted in FIG. 5C. This can be done but it would have to be accounted for in the Doppler processing. In the example embodiments described below, the chirps come out of the same modulator with the same bandwidth and timing—exactly. This guarantees that the Doppler and range the system observes perfectly overlap. Different B and r would be used in the case of a system that is directly modulating the laser frequency (versus using external electronic modulation). In that case two lasers or a sequential approach is useful for generating the up-chirp and down-chirp, as depicted in FIG. 6. This opens the door to different B and r for the two lasers or the sequential chirp.

In step 802 the transmitted signal is directed to a spot in a scene where there might be, or might not be, an object or a part of an object.

In step 803, the returned up chirp return signal is separated from the down chirp return signal. For example, the up chirp and down chirp are in different optical frequency bands and the separation is accomplished by a return path that includes splitting the return signal into two copies and passing each through a different optical filter. One filter (e.g., optical filter 626) passes the frequencies of the up chirp while blocking the frequencies of the down chirp; and, the other filter (e.g., optical filter 628) passes the frequencies of the down chirp while blocking the frequencies of the up chirp. When the up chirp and down chirp are transmitted sequentially, the separation is done by processing the signals in different time windows rather than by passing through an optical filter, and both chirps can use the same frequency band.

In step 805, the separated up chirp return is combined with the up chirp reference signal at a first detector to determine zero or more frequency differences (or resulting beat frequencies) in the up chirp return signal. For example, the electrical signal from a detector is operated on by a FFT module in hardware or software on a programmable processor. When the up chirp signal and down chirp signal are transmitted simultaneously, then the up-chirp and down chirp portions of the return signal are separated using one or more of the methods and systems described above, e.g., a frequency shift of transmitted or return signal relative to the reference signal as in FIG. 3B, or optical filtering as in FIG. 6.

In step 807, one or more up-chirp ranges, $R_{1up}, \ldots R_{Nup}$, are determined based on the one or more up chirp frequency differences (beat frequencies), e.g., using Equation 1b or equivalent in processor 662. In addition, one or more down-chirp ranges, $R_{1down}, \ldots R_{Mdown}$, are determined based on the one or more down chirp frequency differences (beat frequencies), e.g., using Equation 1b or equivalent in processor 662. Returns that have no up chirp beat frequencies or have no down chirp beat frequencies are discarded during step 807. As a result of step 807, the sets $S_{up}$ and $S_{down}$ are generated, as expressed in Equations 3a and 3b for each transmitted signal illuminating some spot in a scene.

In step 811, values for elements of a cost matrix are determined, using any of the measures of dissimilarity identified above, such as difference in range, differences in peak height, differences in peak width, or differences in any other beat frequency peak characteristic, or some scalar or vector combination. In some embodiments, the cost for each pair of ranges is a scalar weighted function of several of these measures, e.g., giving highest weight (e.g., about 60%) to differences in range, a moderate weight (e.g., about 30%) to differences in peak height, and a low weight (e.g., about 10%) to differences in peak width. In some embodiments, a bias term is added to each element of the cost matrix, which accounts for the motion of the imaging system and the direction in which it may be pointed. This is advantageous in embodiments for mobile imaging where a non-zero, signed Doppler value may be expected in the case that the imaging system is targeting a stationary object but itself is in motion. In other embodiments, the object is moving or the object and imaging are both moving and it is advantageous to add bias terms based on the relative motion and tracking of the object. The magnitude of the correction depends only on the element of the velocity on a line connecting the imaging system and the target, called the radial direction. Thus, in some embodiments, the bias depends on the direction of beam pointing relative to the motion of the sensor. Note that the imaging system could itself be used to estimate relative velocities. The cost matrix includes a cost for every pair of ranges in the two sets, one up-chirp range and one down-chirp range.

In step 813, at least one up-chirp range is matched to at least one down-chirp range based on the cost matrix, for example using bi-partite graph matching algorithms. It was found that greedy matching provides the advantages of being simpler to implement, faster to operate, and sufficient to make good automatic matches for Doppler correction purposes. This approach has generated imagery with better Doppler compensation than naïve approaches such as sequential pairing of brightest peaks on the up and down sides or always pairing of the closest peaks in range and proceeding outwards, as shown, for example, in FIG. 9B and FIG. 9C, described below.

In step 815, at least one matched pair for the current illuminated spot is used to determine a Doppler effect at the spot for at least one object or portion of an object illuminated in the spot by differencing the ranges in the pair. In some embodiments, the Doppler corrected range is determined based on combining the two ranges in the pair, e.g., by averaging. In some embodiments, a weighted average is used if one of the up-chirp range or down-chirp range is considered more reliable. One range may be considered more reliable, for example, because it is based on a broader bandwidth or longer duration. In some embodiments, a measure of reliability is used to weight the range, giving more weight to the more reliable range. If several matched ranges are available for the current illuminated spot, all matched pairs are used to find multiple ranges or multiple Doppler effects for the spot.

In step 821 it is determined whether there is another spot to illuminate in a scene of interest, e.g., by scanning the scanning optical coupler 320 to view a new spot in the scene of interest. If so, control passes back to step 802 and following steps to illuminate the next spot and process any returns. If not, then there are no further spots to illuminate before the results are used, and control passes to step 823.

In step 823, a device is operated based on the Doppler effect or the corrected ranges. In some embodiments, this involves presenting on a display device an image that indicates a Doppler corrected position of any object at a plurality of spots illuminated by the transmitted optical signal. In some embodiments, this involves communicating, to the device, data that identifies at least one object based on a point cloud of Doppler corrected positions at a plurality of spots illuminated by transmitted optical signal. In some embodiments, this involves presenting on a display device an image that indicates a size of the Doppler effect at a plurality of spots illuminated by the transmitted optical signal, whereby moving objects are distinguished from stationary objects and absent objects. In some embodiments, this involves moving a vehicle to avoid a collision with an object, wherein a closing speed between the vehicle and the object is determined based on a size of the Doppler effect at a plurality of spots illuminated by the transmitted optical signal. In some embodiments, this involves identifying the vehicle or identifying the object on the collision course based on a point cloud of Doppler corrected positions at a plurality of spots illuminated by the transmitted optical signal. Filtering the point cloud data based on Doppler has the effect of identifying and removing vegetation that may be moving in the breeze. Hard targets, man-made targets, or dense targets are then better revealed by the filtering process. This can be advantageous in defense and surveillance scenarios. In the vehicle scenario—the Doppler can be used to segment targets (i.e. road surface versus moving vehicle).

4. EXAMPLE EMBODIMENTS

In these example embodiments, the LIDAR system used components illustrated above to produce simultaneous up and down chirp transmitted signals. This system is commercially available as the HRS-3D from BLACKMORE SENSORS AND ANALYTICS, INC.™ of Bozeman Montana. In these example embodiments, greedy matching was used. The first match is the one with the lowest cost. That pair is then removed and the pair with the next lowest cost is used.

Figure 9A:
FIGS. 9A through 9C are images that illustrates an example output on a display device based on Doppler corrected ranges and improvement over non-corrected ranges, according to embodiments.
Figure 9B:
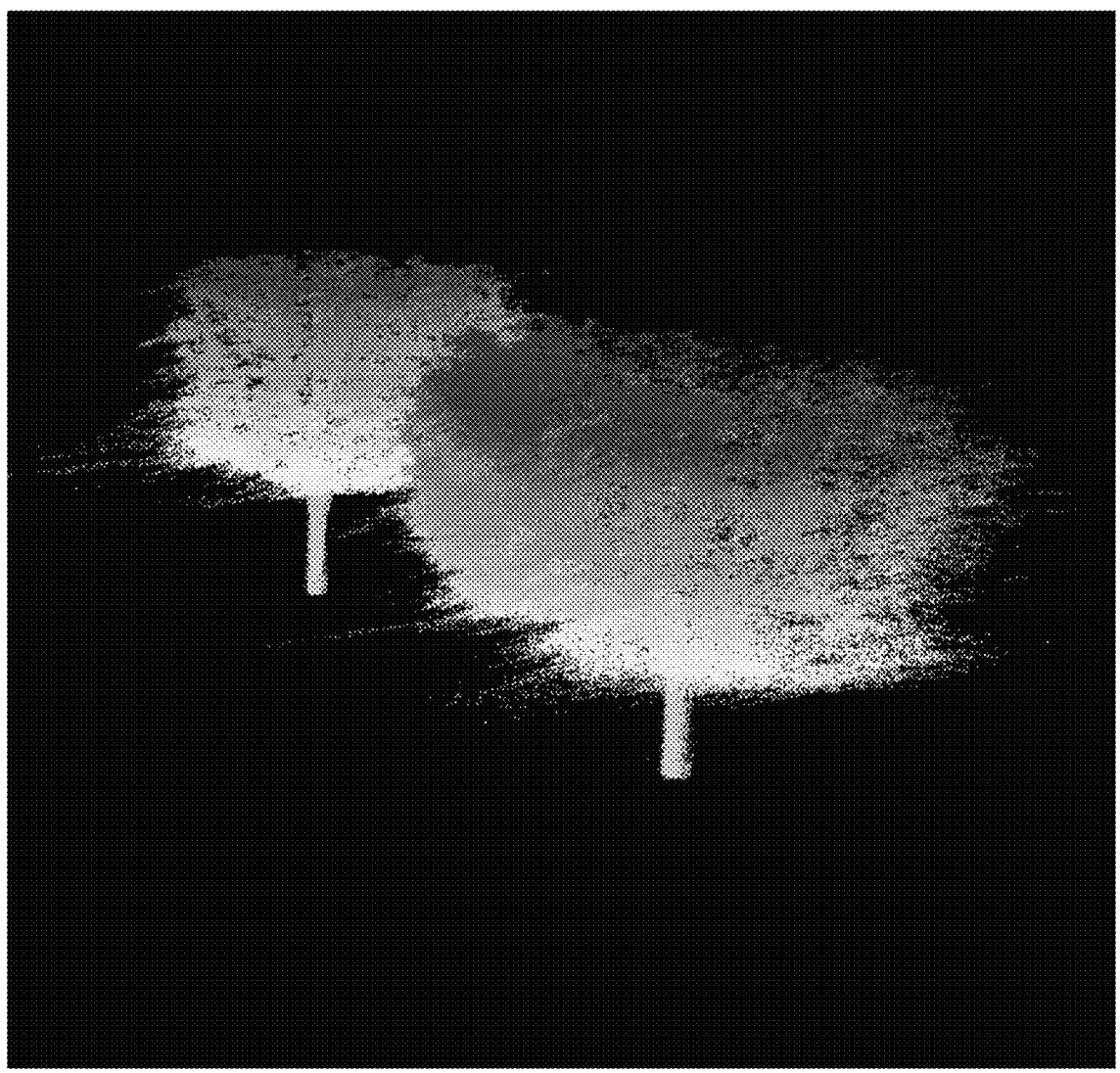
Figure 9C:
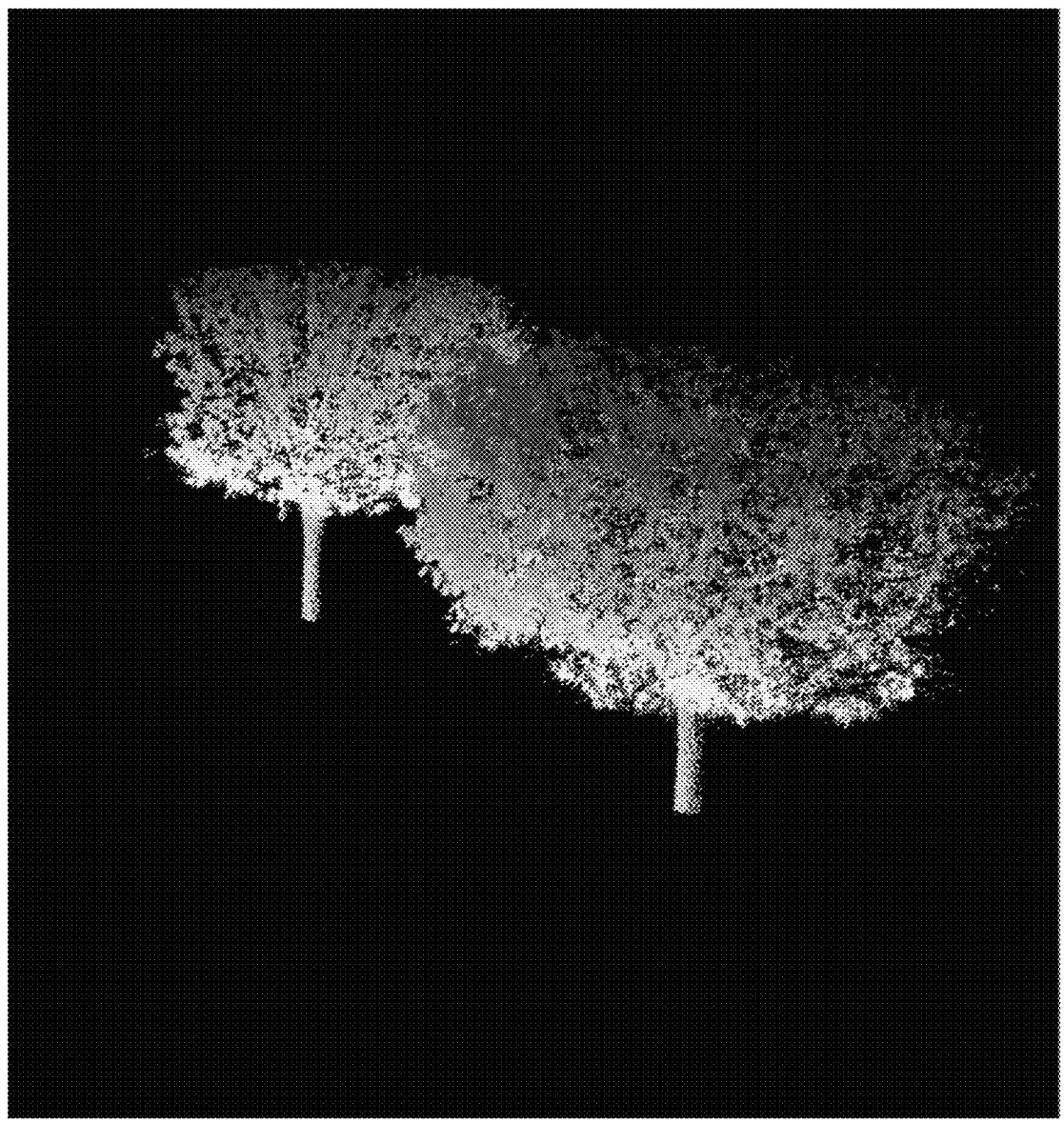

FIG. 9A through 9C are images that illustrates an example output on a display device based on Doppler corrected ranges and improvement over non-corrected ranges, according to embodiments. The image of FIG. 9A was collected using a wide field of view (FOV), three dimensional (3D) FM chirped waveform (FMCW) LIDAR system. This scene was imaged with B=2 gigahertz (GHz, 1 GHZ=$10^9$ Hertz) optical bandwidth waveform. The dark pixels of the image represent no return, the white pixels represent stable returns with negligible Doppler effect (up chirp-range and down-chirp range are the same). The grey areas represent pixels with a non-negligible Doppler effect using a binary filter on Doppler magnitude. The gray pixels demonstrate sensitivity to motion of vegetation. The image clearly distinguishes vegetation from hard targets. Post-processing eliminated unwanted intensity speckle on hard target surfaces. In the example embodiment, the threshold was picked empirically. In other embodiments several thresholds ae selected with some measure of goodness of result; and the threshold that gives the best result is selected.

The image of FIG. 9B was collected using the same configuration as in FIG. 9A, but without performing Doppler compensation in the post detector processing. The image of FIG. 9C was collected with the same LIDAR system, but performing the Doppler correction using the method of FIG. 8. As can be seen the blurring caused by leaf motion in the trees is greatly reduced in FIG. 9C, allowing more individual branches and leaves to be discerned.

Another test was run with a fast frame rate, narrow field of view imager that produces 10,000 data-point point clouds per frame at a 10 Hz frame rate. A test person ran back and forth in the field of view of the sensor. Each image of the person is cut from a time series of several hundred 3D imaging frames (cut from the same 3D orientation perspective).

Figure 10A:
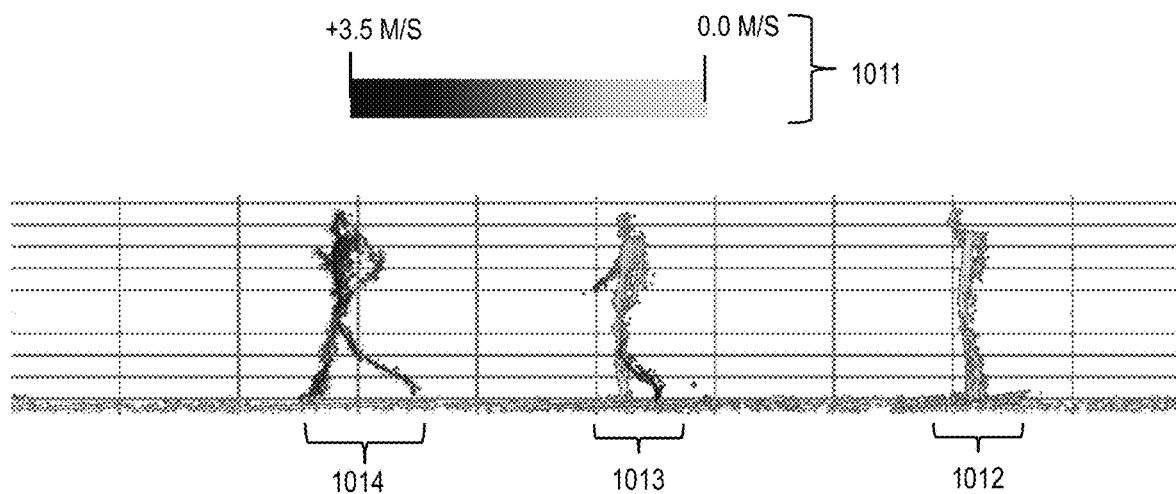
FIG. 10A is a set of three images that illustrate an example output on a display device based on Doppler corrected ranges for a target approaching a LIDAR system, according to an embodiment.

FIG. 10A is a set of three images that illustrate an example output on a display device based on Doppler corrected ranges for a target approaching a LIDAR system, according to an embodiment. Each dot indicates a perspective view in 3D space based on range to a spot on an object, in this case a moving person. The dots are plotted with a grey scale that extends from light for no motion relative to LIDAR system to black for a closing speed of 3.5 meters per second (m/s). White pixels indicate no return. Three different images are superimposed. The image 1012 clearly indicates a nearly stationary person on a nearly stationary surface. The image 1013 clearly indicates the person with some moving parts and some almost stationary parts. The main body and forward leg appear to be almost stationary, while the back leg and forward arm are both clearly moving faster toward the LIDAR system, as would be expected with a walking gait. The image 1014 clearly indicates the person moving quickly. The speed of the body and forward leg is higher than the speed of the trailing leg, consistent with a running gait. The relative movement is even more apparent in a color scale than it is in the greyscale illustrated. Furthermore, the different speed parts of the person are not displaced from their correct relative positions.

Figure 10B:
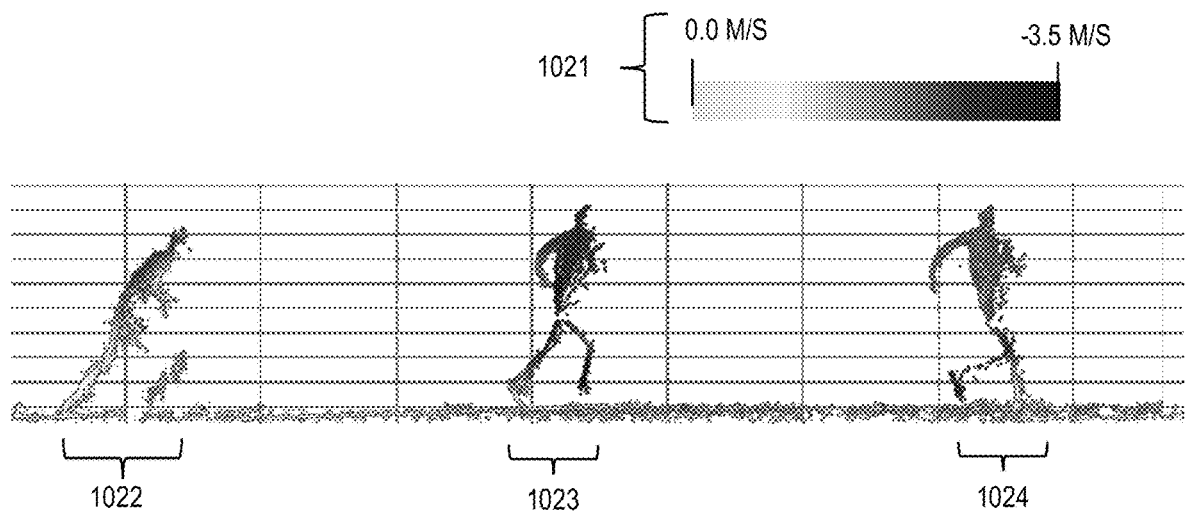
FIG. 10B is a set of three images that illustrate an example output on a display device based on Doppler corrected ranges for a target retreating from a LIDAR system, according to an embodiment.

FIG. 10B is a set of three images that illustrate an example output on a display device based on Doppler corrected ranges for a target retreating from a LIDAR system, according to an embodiment. Each dot indicates a location in a perspective view in 3D space based on range to a spot on an object, in this case a moving person. The dots are plotted with a grey scale that extends from light for no motion relative to LIDAR system to black for an opening speed of 3.5 m/s. White pixels indicate no return. Three different images are superimposed. The image 1022 clearly indicates a person moving away at a moderate speed about −2 m/s. The image 1023 clearly indicates the person moving away at a greater speed about −3 m/s, with a plant leg somewhat slower consistent with a running gait. The image 1024 clearly indicates the person moving away at a reduced speed about −2 m/s, with a plant leg and body somewhat slower than the raised leg, consistent with coming to a stop after a run. The relative movement is even more apparent in a color scale than it is in the greyscale illustrated. As above, the different speed parts of the person are not displaced from their correct relative positions.

Thus the system not only correctly places all pixels on a person's form with corrected ranges, but also ascertains the movement of the figure based on the Doppler effect.

Figure 11:
FIG. 11 is an image that illustrates an example output on a display device based on Doppler corrected ranges at high resolution, according to an embodiment.

In another embodiment, the system is used to correct for swaying vegetation. A collimated laser beam is scanned through overhead trees. The probability of having multiple returns with Doppler values present is very high, especially with a slight breeze or wind present. Such vegetation provides dense scatterers separated closely in range along a given line of sight. Wind itself can cause Doppler shifts in the vegetation, thus making the imaging of the vegetation even more challenging. FIG. 11 is an image that illustrates an example output on a display device based on Doppler corrected ranges at high resolution, according to an embodiment. As this image demonstrates, very crisp imagery can be obtained with the described technique. This provides strong evidence that the technique is effective at providing very realistic imagery in such scenarios.

5. COMPUTATIONAL HARDWARE OVERVIEW

Figure 12:
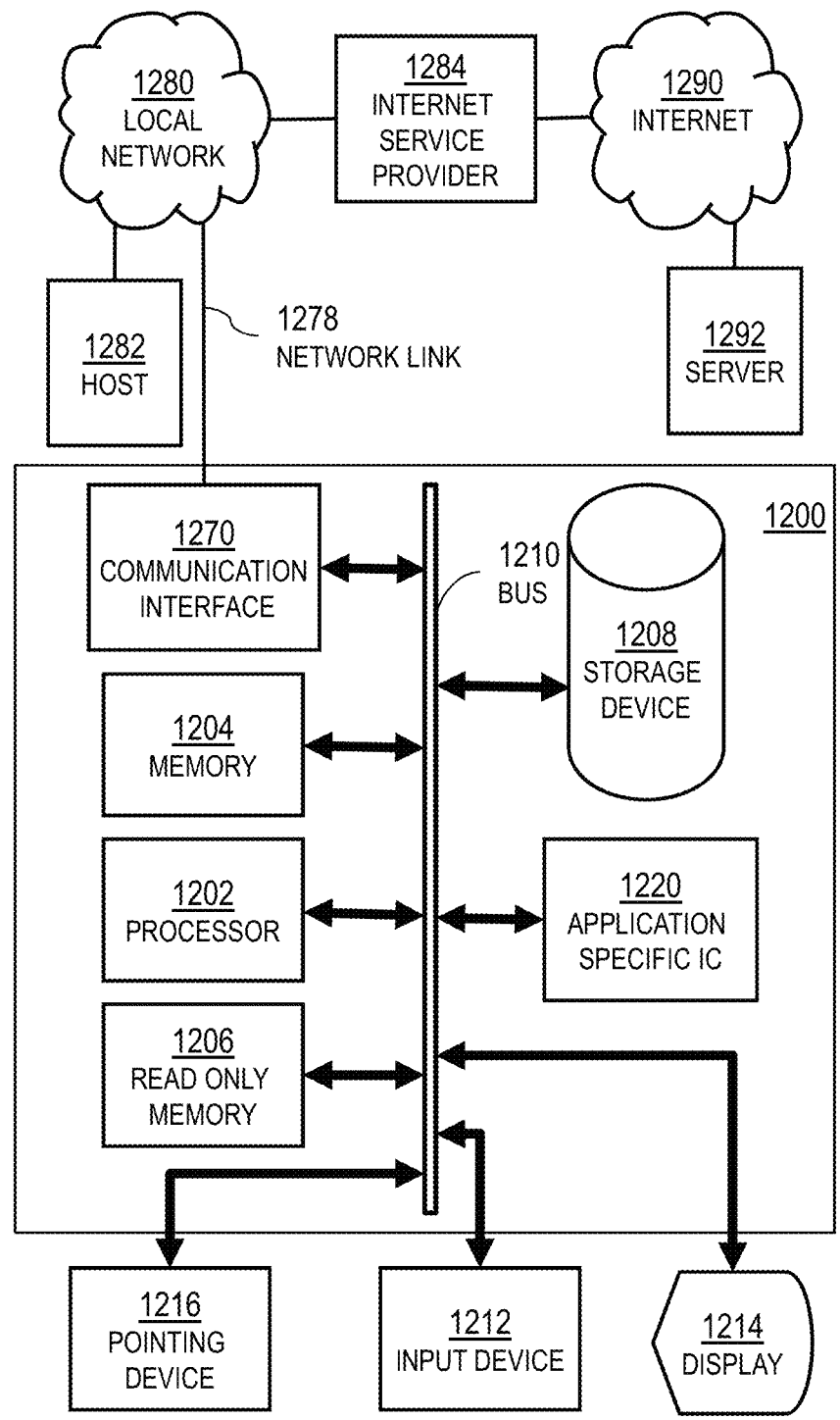
FIG. 12 is a block diagram that illustrates a computer system upon which an embodiment of the invention may be implemented.

FIG. 12 is a block diagram that illustrates a computer system 1200 upon which an embodiment of the invention may be implemented. Computer system 1200 includes a communication mechanism such as a bus 1210 for passing information between other internal and external components of the computer system 1200. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of one or more methods described herein.

A sequence of binary digits constitutes digital data that is used to represent a number or code for a character. A bus 1210 includes many parallel conductors of information so that information is transferred quickly among devices coupled to the bus 1210. One or more processors 1202 for processing information are coupled with the bus 1210. A processor 1202 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication. A sequence of operations to be executed by the processor 1202 constitutes computer instructions.

Computer system 1200 also includes a memory 1204 coupled to bus 1210. The memory 1204, such as a random access memory (RAM) or other dynamic storage device, stores information including computer instructions. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of computer instructions. The computer system 1200 also includes a read only memory (ROM) 1206 or other static storage device coupled to the bus 1210 for storing static information, including instructions, that is not changed by the computer system 1200. Also coupled to bus 1210 is a non-volatile (persistent) storage device 1208, such as a magnetic disk or optical disk, for storing information, including instructions, that persists even when the computer system 1200 is turned off or otherwise loses power.

Information, including instructions, is provided to the bus 1210 for use by the processor from an external input device 1212, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD), for presenting images, and a pointing device 1216, such as a mouse or a trackball or cursor direction keys, for controlling a position of a small cursor image presented on the display 1214 and issuing commands associated with graphical elements presented on the display 1214.

In the illustrated embodiment, special purpose hardware, such as an application specific integrated circuit (IC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals, that carry information streams, such as digital data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1202, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1202, except for carrier waves and other signals.

Logic encoded in one or more tangible media includes one or both of processor instructions on a computer-readable storage media and special purpose hardware, such as ASIC 1220.

Network link 1278 typically provides information communication through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290. A computer called a server 1292 connected to the Internet provides a service in response to information received over the Internet. For example, server 1292 provides information representing video data for presentation at display 1214.

The invention is related to the use of computer system 1200 for implementing the techniques described herein. According to one embodiment of the invention, those techniques are performed by computer system 1200 in response to processor 1202 executing one or more sequences of one or more instructions contained in memory 1204. Such instructions, also called software and program code, may be read into memory 1204 from another computer-readable medium such as storage device 1208. Execution of the sequences of instructions contained in memory 1204 causes processor 1202 to perform the method steps described herein. In alternative embodiments, hardware, such as application specific integrated circuit 1220, may be used in place of or in combination with software to implement the invention. Thus, embodiments of the invention are not limited to any specific combination of hardware and software.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1202 as it is received, or may be stored in storage device 1208 or other non-volatile storage for later execution, or both. In this manner, computer system 1200 may obtain application program code in the form of a signal on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red a carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
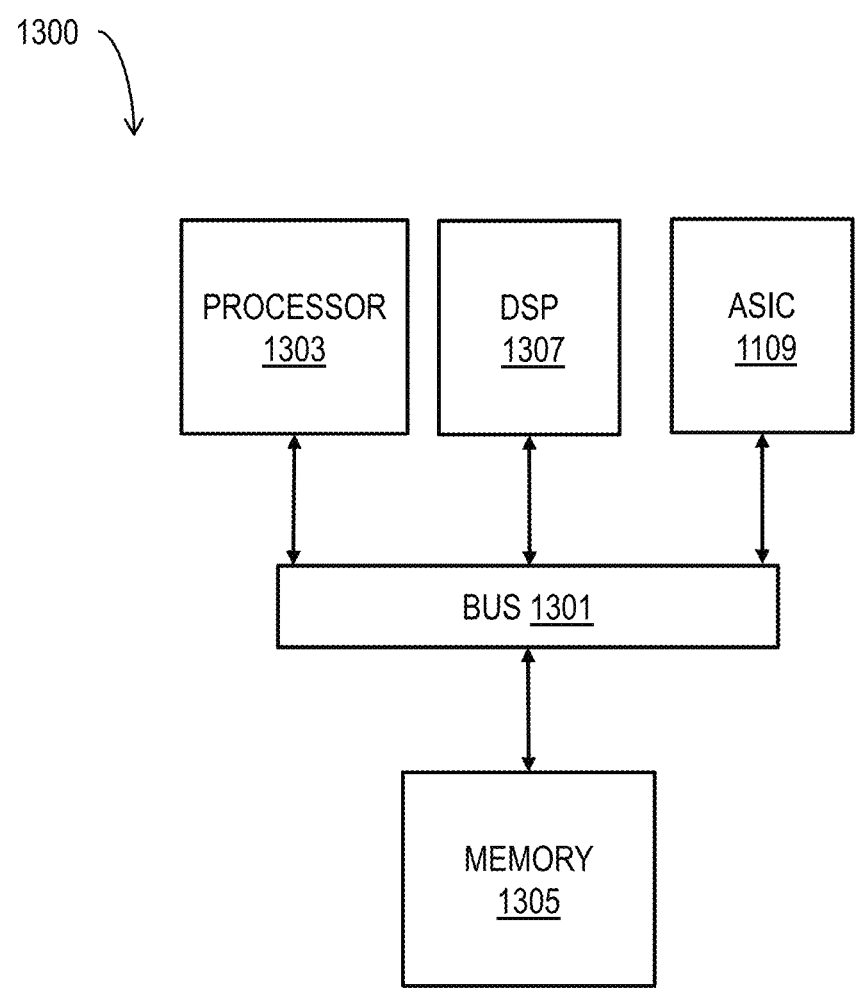
FIG. 13 illustrates a chip set upon which an embodiment of the invention may be implemented.

FIG. 13 illustrates a chip set 1300 upon which an embodiment of the invention may be implemented. Chip set 1300 is programmed to perform one or more steps of a method described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of a method described herein.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1305 also stores the data associated with or generated by the execution of one or more steps of the methods described herein.

6. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. REFERENCES

Adany, P., C. Allen, and R. Hui, "Chirped Lidar Using Simplified Homodyne Detection," Jour. Lightwave Tech., v. 27 (16), 15 Aug., 2009.
Hui, R., C. Allen, and P. Adany, "Coherent detection scheme for FM Chirped laser RADAR," U.S. Pat. No. 7,742,152, 22 Jun. 2010.
Kachelmyer, A. L., "Range-Doppler Imaging with a Laser Radar," The Lincoln Laboratory Journal, v. 3. (1), 1990.
Munkres, J., "Algorithms for the Assignment and Transportation Problems," Journal of the Society for Industrial and Applied Mathematics, v 5 (1), pp 32-38, March, 1957.

What is claimed is:

1. A light detection and ranging (LIDAR) sensor system, comprising:
a laser source configured to generate at least one laser signal;
a modulator configured to modulate the at least one laser signal to generate a plurality of first signals that increase in frequency and a plurality of second signals that decrease in frequency; and
one or more processors configured to:
determine a plurality of first ranges to an object using a plurality of first return signals from reflection of the plurality of first signals by the object;
determine a plurality of second ranges to the object using a plurality of second return signals from reflection of the plurality of second signals by the object; and
select a first range of the plurality of first ranges that matches a second range of the plurality of second ranges by comparing each first range of the plurality of first ranges with each second range of the plurality of second ranges.

2. The LIDAR sensor system of claim 1, wherein the modulator is configured to apply modulation to a current driving the laser source.

3. The LIDAR sensor system of claim 1, wherein the modulator is configured to generate the plurality of first signals to increase in frequency based on a bandwidth from about 300 MHz to about 20 GHz, and a duration from about 250 nanoseconds (ns) to about 1 millisecond (ms).

4. The LIDAR sensor system of claim 1, further comprising one or more scanning optics configured to output the plurality of first signals and the plurality of second signals.

5. The LIDAR sensor system of claim 1, wherein the laser source is configured to output the at least one laser signal as a plurality of pulses.

6. The LIDAR sensor system of claim 1, wherein the modulator is configured to generate a given second signal of the plurality of second signals after a given first signal of the plurality of first signals.

7. The LIDAR sensor system of claim 1, wherein the one or more processors are configured to move a vehicle to avoid collision with the object based on the selected first range.

8. The LIDAR sensor system of claim 1, wherein the modulator comprises a double sideband Mach-Zehnder modulator.

9. The LIDAR sensor system of claim 1, wherein the laser source comprises a single optical carrier to generate the at least one laser signal and the modulator is configured to modulate the at least one laser signal by a single RF chirp to produce symmetrical sidebands corresponding to the plurality of first signals and the plurality of second signals.

10. A vehicle control system, comprising:
a laser source configured to generate at least one laser signal;
a modulator configured to modulate the at least one laser signal to generate a plurality of first signals that increase in frequency and a plurality of second signals that decrease in frequency; and
one or more processors configured to:
determine a plurality of first ranges to an object using a plurality of first return signals from reflection of the plurality of first signals by the object;
determine a plurality of second ranges to the object using a plurality of second return signals from reflection of the plurality of second signals by the object; and
control a vehicle based on a third range determined by matching a first range of the plurality of first ranges with a second range of the plurality of second ranges by comparing each first range of the plurality of first ranges with each second range of the plurality of second ranges.

11. The vehicle control system of claim 10, wherein the modulator is configured to apply modulation to a current driving the laser source.

12. The vehicle control system of claim 10, wherein the modulator is configured to generate the plurality of first signals to increase in frequency based on a bandwidth from about 300 MHz to about 20 GHz, and a duration from about 250 nanoseconds (ns) to about 1 millisecond (ms).

13. The vehicle control system of claim 10, further comprising one or more scanning optics configured to output the plurality of first signals and the plurality of second signals.

14. The vehicle control system of claim 10, wherein the laser source is configured to output the at least one laser signal as a plurality of pulses.

15. The vehicle control system of claim 10, wherein the one or more processors are configured to move the vehicle to avoid collision with the object based on the third range.

16. The vehicle control system of claim 10, wherein the laser source comprises a single optical carrier to generate the at least one laser signal and the modulator is configured to modulate the at least one laser signal by a single RF chirp to produce symmetrical sidebands corresponding to the plurality of first signals and the plurality of second signals.

17. A method, comprising:
generating a plurality of first signals that increase in frequency and a plurality of second signals that decrease in frequency;
determining a plurality of first ranges to an object using a plurality of first return signals from reflection of the plurality of first signals by the object;
determining a plurality of second ranges to the object using a plurality of second return signals from reflection of the plurality of second signals by the object; and
controlling a vehicle based on a third range determined by matching a first range of the plurality of first ranges with a second range of the plurality of second ranges by comparing each first range of the plurality of first ranges with each second range of the plurality of second ranges.

18. The method of claim 17, further comprising moving the vehicle to avoid collision with the object based on the third range.

\* \* \* \* \*